(12) United States Patent
Hulburt et al.

(10) Patent No.: US 7,989,713 B2
(45) Date of Patent: *Aug. 2, 2011

(54) ADJUSTABLE WEIGHING SCALE

(75) Inventors: Joan Hulburt, Cleveland, OH (US);
Brian B. Mathewson, Rocky River, OH (US)

(73) Assignee: Joan Hulburt, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,862

(22) Filed: Mar. 18, 2010

(65) Prior Publication Data
US 2010/0170721 A1 Jul. 8, 2010

Related U.S. Application Data

(63) Continuation of application No. 12/206,253, filed on Sep. 8, 2008, now Pat. No. 7,683,273, which is a continuation of application No. 11/339,380, filed on Jan. 25, 2006, now Pat. No. 7,435,917, which is a continuation-in-part of application No. 10/680,796, filed on Oct. 7, 2003, now Pat. No. 7,022,920.

(51) Int. Cl.
G01G 21/00 (2006.01)
G01G 21/22 (2006.01)
G01G 21/28 (2006.01)

(52) U.S. Cl. ........................................ 177/126; 177/256

(58) Field of Classification Search .................. 177/126, 177/127, 256
See application file for complete search history.

(56) References Cited

U.S. PATENT DOCUMENTS

| | | | |
|---|---|---|---|
| 2,869,855 | A | 1/1959 | Murphy |
| 3,043,386 | A | 7/1962 | Marion et al. |
| 3,272,269 | A | 9/1966 | Murphy |
| 3,985,191 | A | 10/1976 | Wellman |
| 4,043,413 | A | 8/1977 | Schaenen |
| 4,085,810 | A | 4/1978 | Wellman |
| 4,281,730 | A | 8/1981 | Swersey et al. |
| 4,431,072 | A | 2/1984 | Stepp |
| D274,991 | S | 8/1984 | Wirtz |
| 4,537,266 | A | 8/1985 | Greenberg |
| 4,542,547 | A | 9/1985 | Sato |
| 4,711,313 | A | 12/1987 | Iida et al. |
| 4,765,421 | A | 8/1988 | Newton et al. |
| 4,782,905 | A | 11/1988 | Lam |
| D304,308 | S | 10/1989 | Morooka |

(Continued)

FOREIGN PATENT DOCUMENTS

EP 1821085 A1 * 8/2007
(Continued)

OTHER PUBLICATIONS

English language abstract and a machine translation for FR 2 811 078.

Primary Examiner — Randy W Gibson
(74) Attorney, Agent, or Firm — Fay Sharpe LLP

(57) ABSTRACT

An adjustable weighing scale includes first and second scale sections deployable in a full-width configuration and an extended-width configuration. A connecting member extends between the scale sections. Load sensing apparatuses are mounted on the scale sections and output signals related to a portion of the full weight of an associated object on the scale. An output device receives the signals and communicates the full weight sensed by the scale in appropriate units.

20 Claims, 25 Drawing Sheets

U.S. PATENT DOCUMENTS

| | | | |
|---|---|---|---|
| 5,065,830 | A | 11/1991 | Stevenson |
| 5,129,472 | A | 7/1992 | Du et al. |
| 5,234,065 | A | 8/1993 | Schmidt |
| 5,393,935 | A | 2/1995 | Hasty et al. |
| 5,414,225 | A | 5/1995 | Garfinkle |
| 5,446,248 | A | 8/1995 | Strasser |
| 5,955,705 | A | 9/1999 | Germanton |
| 5,994,649 | A | 11/1999 | Garfinkle et al. |
| 6,337,446 | B1 | 1/2002 | Hulburt et al. |
| 6,765,154 | B2 | 7/2004 | Sternberg |
| 7,022,920 | B2 | 4/2006 | Hulburt et al. |
| 7,282,652 | B1 | 10/2007 | Johnson et al. |
| 7,348,501 | B1 | 3/2008 | Nugent, Jr. |
| 7,435,917 | B2 | 10/2008 | Hulburt et al. |
| 7,442,885 | B2 | 10/2008 | Hsu |
| 7,521,638 | B1 | 4/2009 | Godshaw et al. |

FOREIGN PATENT DOCUMENTS

FR    2 811 078    1/2002

* cited by examiner

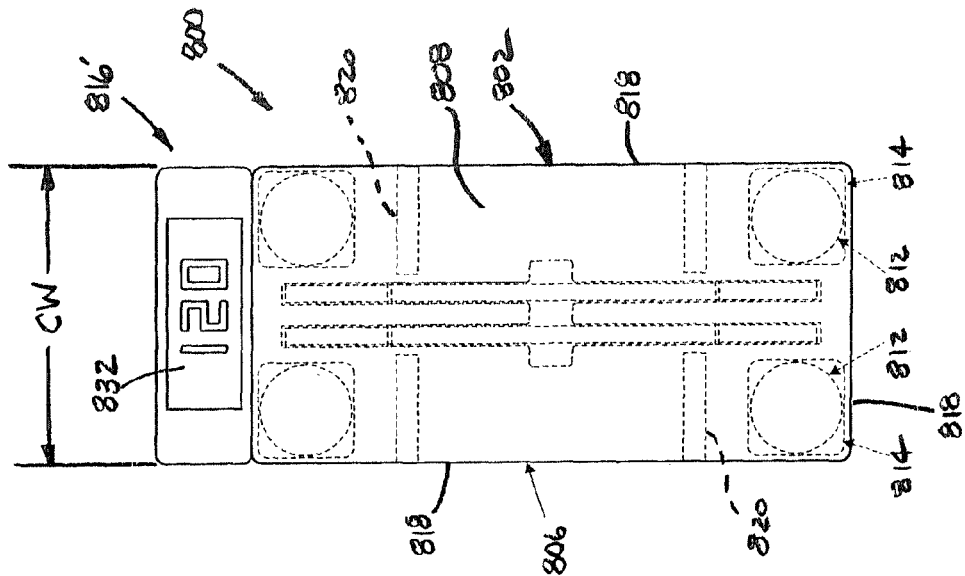
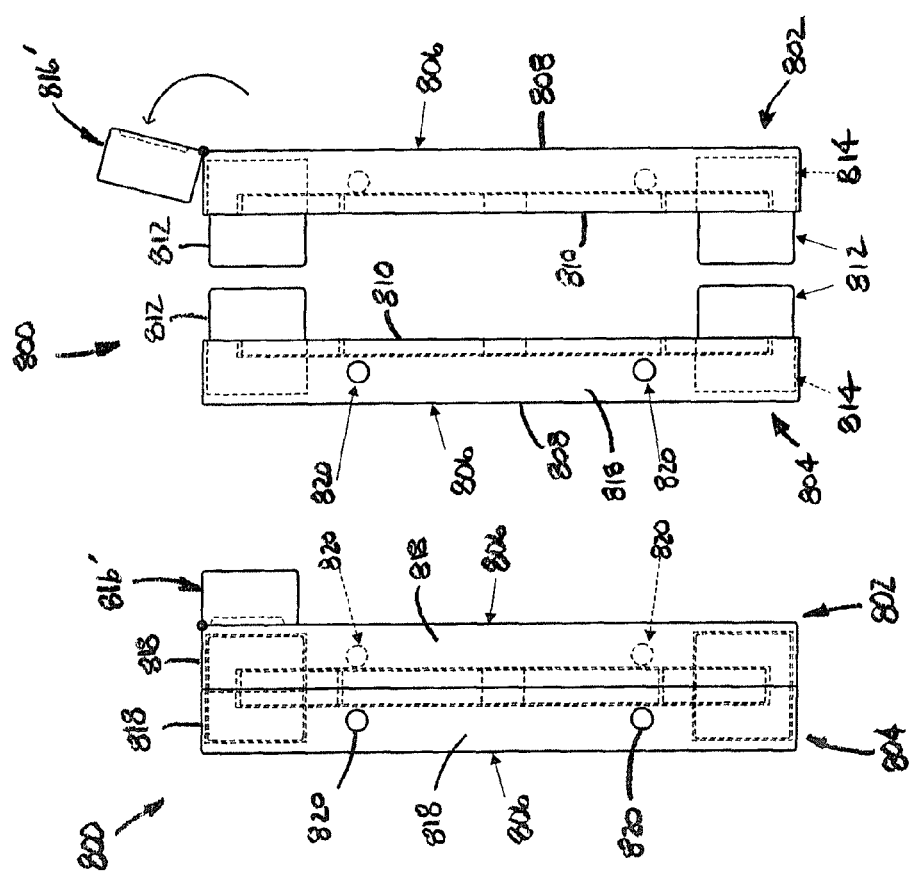
FIGURE 21
FIGURE 19
FIGURE 20

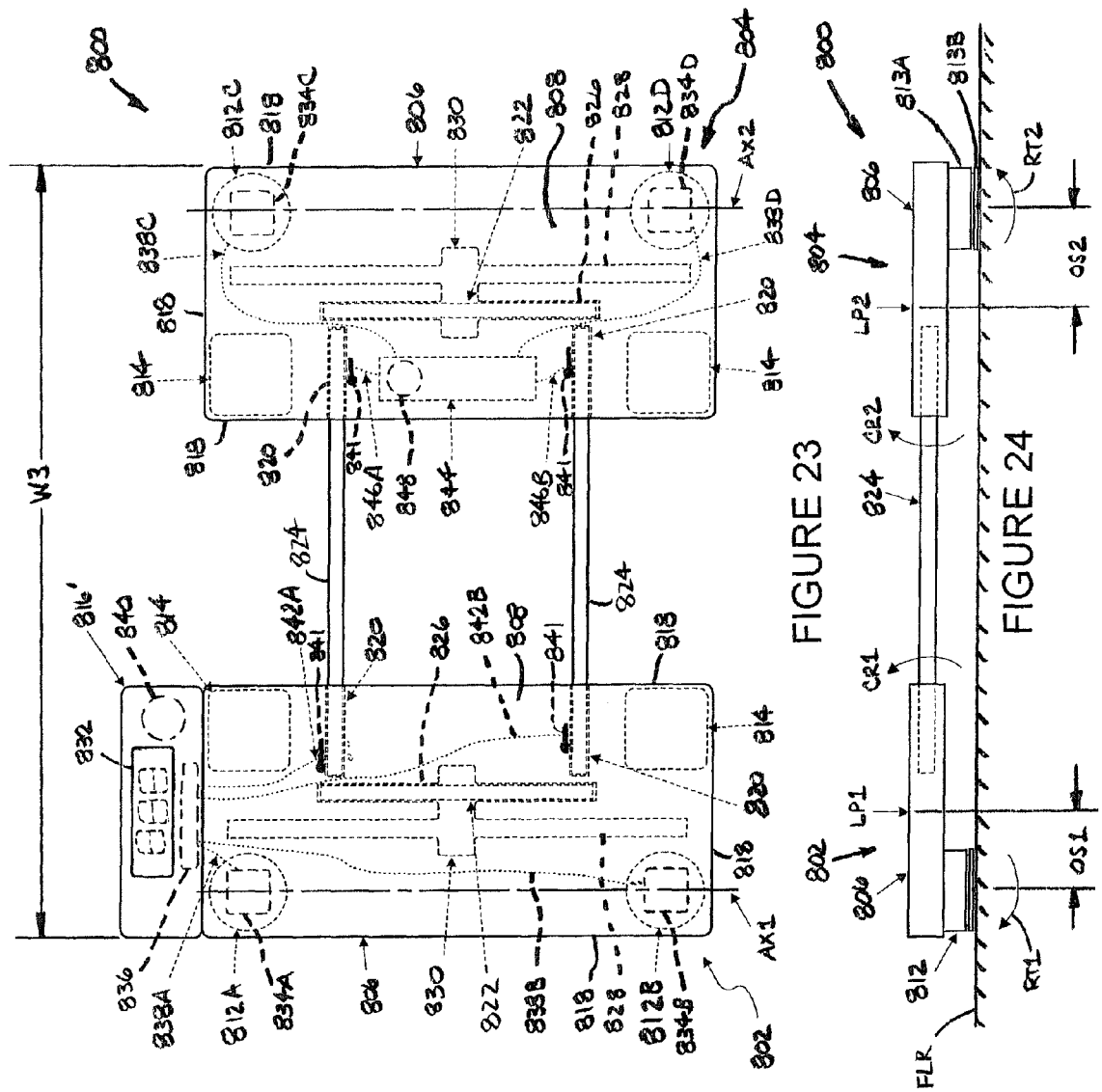

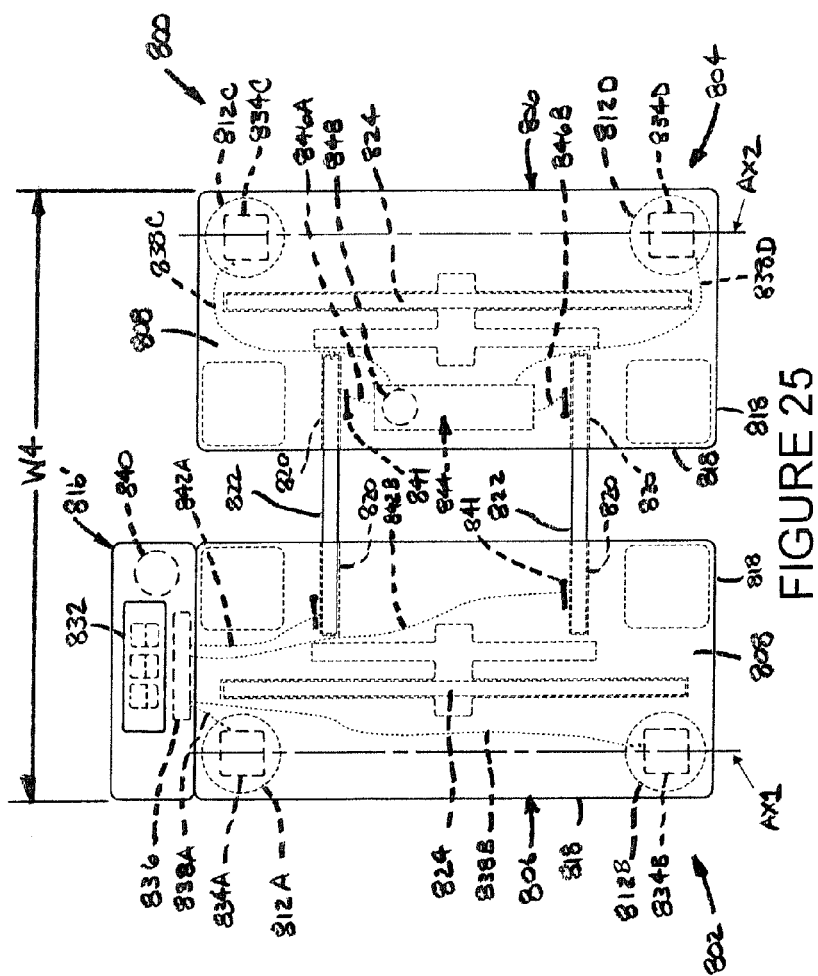
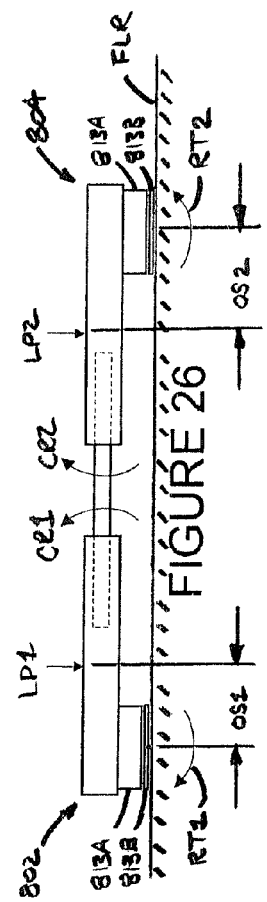
FIGURE 25
FIGURE 26

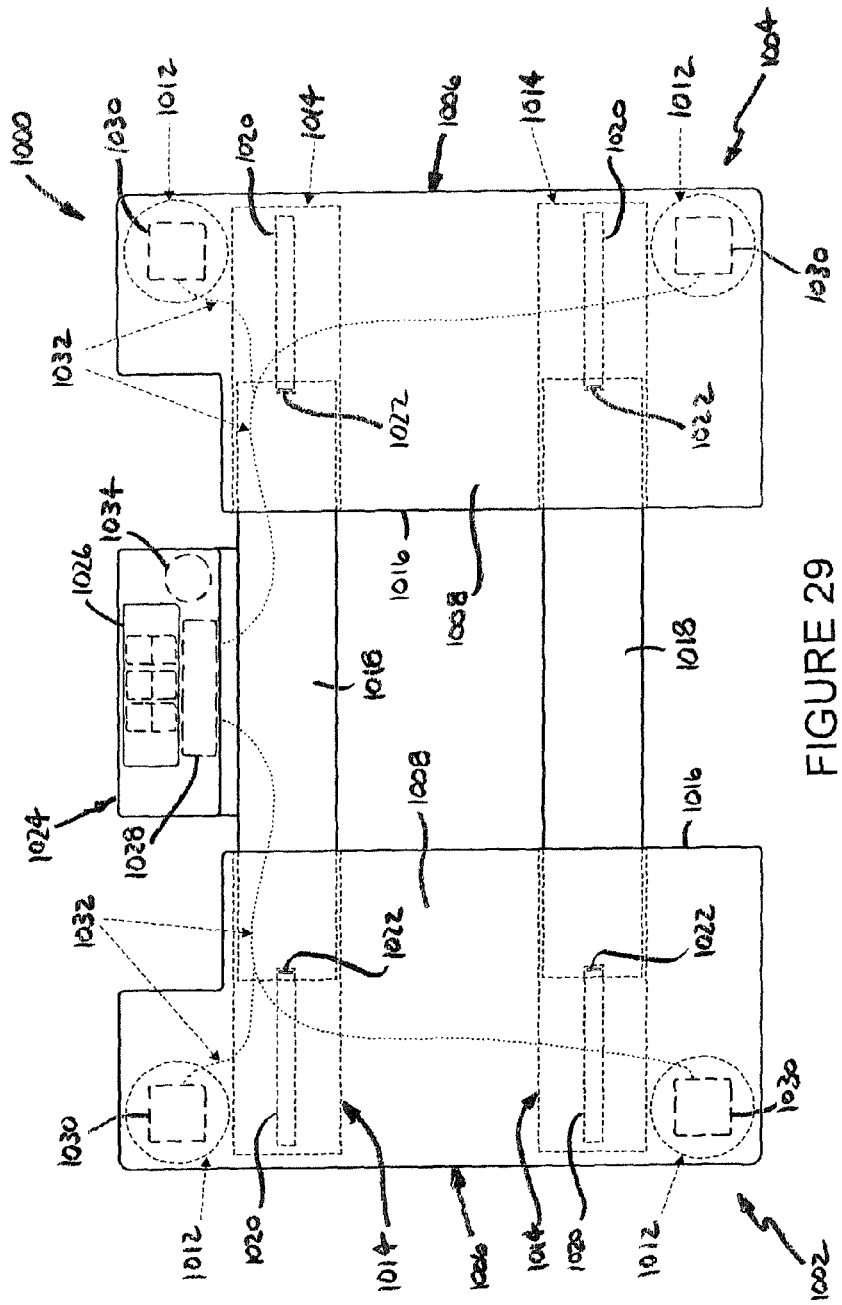
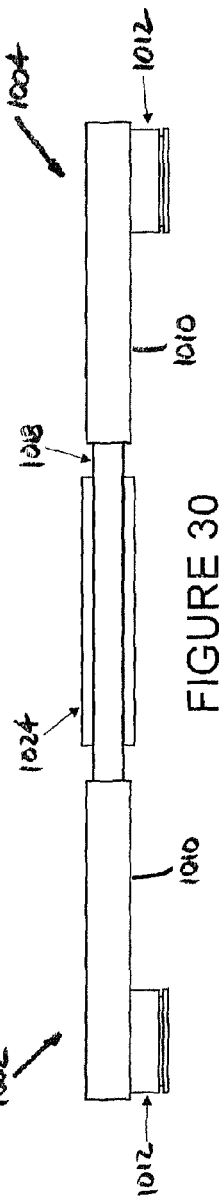
FIGURE 29
FIGURE 30

ADJUSTABLE WEIGHING SCALE

This application is a Continuation of U.S. patent application Ser. No. 12/206,253, filed on Sep. 8, 2008, now issued as U.S. Pat. No. 7,683,273, which is a Continuation of U.S. patent application Ser. No. 11/339,380, filed on Jan. 25, 2006, now issued as U.S. Pat. No. 7,435,917, which is a Continuation-In-Part of U.S. patent application Ser. No. 10/680,796, filed on Oct. 7, 2003, now issued as U.S. Pat. No. 7,022,920. These applications are hereby incorporated herein by reference in their entirety.

INCORPORATION BY REFERENCE

Collapsible weighing scales are generally known. For example, such scales are shown and described in Hulburt, et al., U.S. Pat. No. 6,337,446, which is hereby incorporated herein by reference in its entirety.

BACKGROUND OF THE INVENTION

The subject disclosure relates to the art of portable weighing scales and, more particularly, to adjustable weighing scales that can be transformed between at least one of a collapsed configuration or a normal-width configuration and an extended-width configuration.

Collapsible scales have been provided heretofore and, generally, take the form of folding scales which seem to most often trade width for height providing no significant advantage with regard to portability over comparably sized non-folding scales. For example, in Schmidt, U.S. Pat. No. 5,234,065, the scale can be folded up into one-quarter its original width. However, in doing so, the original thickness is quadrupled. As such, the overall reduction in volume is minimal and the corresponding benefit, with regard to portability, is significantly reduced.

Other collapsible scales, that provide a significant reduction in volume when in compact or collapsed form, are shown in Hulburt, et al., U.S. Pat. No. 6,337,446 (Hulburt '446 hereinafter). However, these scales, too, have certain disadvantages. In particular, the scales disclosed in Hulburt can be complicated or inconvenient to deploy from a compact or collapsed arrangement. Often, these scales require multiple steps to expand from the compact configuration to an extended configuration suitable for use as a weighing scale.

One disadvantage of known collapsible scales is that the same are generally incapable of deployment into two or more usable width configurations. That is, known collapsible scales are typically displaced between a collapsed or storage condition in which the scale is generally unusable, and a deployed or usable condition that is often approximately the same a full-sized scale, such as a typical bathroom scale, for example. However, known collapsible scales are not typically configurable into an extended width that is significantly greater than the normal or full-width condition.

As such, it is considered desirable to develop new and improved adjustable scales that are usable in both a normal or full-width configuration as well as in an extended-width configuration. Additionally, it is considered desirable to develop new and improved adjustable scales that can optionally be arranged into a collapsed or storage configuration in addition to the full-width and extended-width configurations.

SUMMARY OF THE INVENTION

One exemplary embodiment of an adjustable weighing scale in accordance with the present novel concept for use on an associated surface to output a weight of an associated object is provided that includes a first scale section including a first support platform having a first platform width and a second scale section separable from the first scale section and including a second platform having a second platform width. A connecting member structurally interconnects the first and second scale sections. A plurality of load sensing apparatuses is operatively associated with the first and second scale sections and is adapted to output signals related to the weight of the associated object. An output device is in communication with the plurality of load sensing apparatuses and is adapted to communicate the weight of the associated object. The scale is adjustable between a first operative condition and a second operative condition. The scale, in said first operative condition, has a first scale width approximately equal to the first platform width plus the second platform width, and the scale, in said second operative condition, has a second scale width substantially greater than the first scale width.

Another exemplary embodiment of a width-adjustable weighing scale in accordance with the present novel concept for outputting the weight of an associated object is provided that includes a first scale section and a second scale section. The first scale section includes a first platform and a first foot extending therefrom. The first platform has a first platform width and a first platform length that is greater than the first platform width. The second scale section includes a second support platform and a second foot extending therefrom. The second support platform has a second platform width and a second platform length. A connecting member extends between the first and second scale sections and is adapted to inhibit rotation of the first and second scale sections respectively about the first and second feet. Load sensing apparatuses are operatively associated with the first and second scale sections and are adapted to output signals related to the weight of the associated object. An output device is in communication with the load sensing apparatuses and is adapted to communicate the weight of the associated object. The scale is adjustable between a first operative condition and a second operative condition. The scale has a first scale width approximately equal to the first platform width plus the second platform width in the first operative condition. The scale has a second scale width substantially greater than the first scale width in the second operable condition.

A further embodiment of an adjustable weighing scale in accordance with the present novel concept for outputting the weight of an associated object is provided that includes a first scale section and a second scale section. The first scale section includes a first support platform, a first foot extending from the first support platform, and a first electrical connector supported on one of the first support platform or first foot. The second scale section includes a second support platform, a second foot extending from the second support platform, a second passage, and a second electrical connector supported on one of the second support platform or second foot. The scale also includes a support member interconnecting the first and second scale sections. An electrical circuit is formed between the first and second electrical connectors. An output device is adapted to communicate the weight of the associated object. A first load sensing apparatus is operatively associated with the first scale section and is in communication with the output device. The first load sensing device is adapted to output a first signal related to at least a first portion of the weight of the associated object. A second lead sensing apparatus is operatively associated with the second scale section. The second load sensing apparatus is adapted to output a second signal related to at least a second portion of the weight of the associated object. The second load sensing apparatus is in communication with at least one of the first load sensing device or the output device through the electrically-conductive circuit.

BRIEF DESCRIPTION OF THE DRAWINGS

The invention may take form in certain components and structures, preferred embodiments of which are illustrated in the accompanying drawings.

FIG. 19 is an exploded side view of the weighing scale of FIG. 18.

FIG. 20 is a side view of the weighing scale in FIGS. 18 and 19 shown in a fully collapsed position.

FIG. 21 is a top view of the weighing scale in FIGS. 18-20 shown in a fully collapsed position.

FIG. 23 is a top view of the weighing scale in FIGS. 18-22 shown in an extended-width position.

FIG. 24 is an end view of the weighing scale in FIG. 23 shown with forces acting thereon.

FIG. 25 is a top view of the weighing scale in FIGS. 18-24 shown in a normal-width position.

FIG. 26 is an end view of the weighing scale in FIG. 25 shown with forces acting thereon.

FIG. 29 is a top view of the weighing scale in FIG. 28 shown in an extended-width position.

FIG. 30 is an end view of the weighing scale in FIGS. 28-29 shown in an extended-width position.

DETAILED DESCRIPTION OF THE PREFERRED EMBODIMENTS

Figure 1:
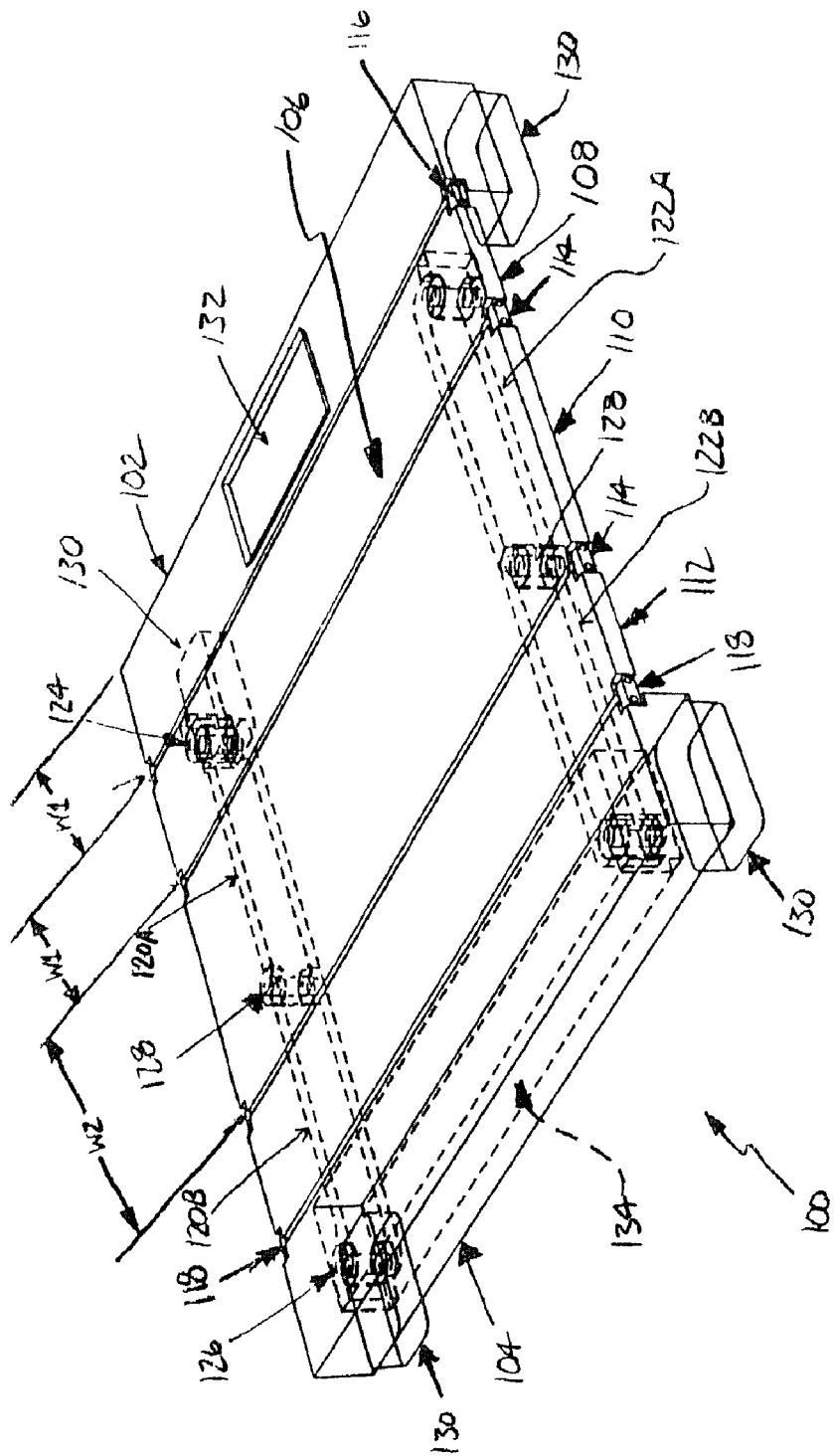
FIG. 1 is a perspective view of a first embodiment of a collapsible weighing scale in accordance with the present invention, shown in an extended position.
Figure 2:
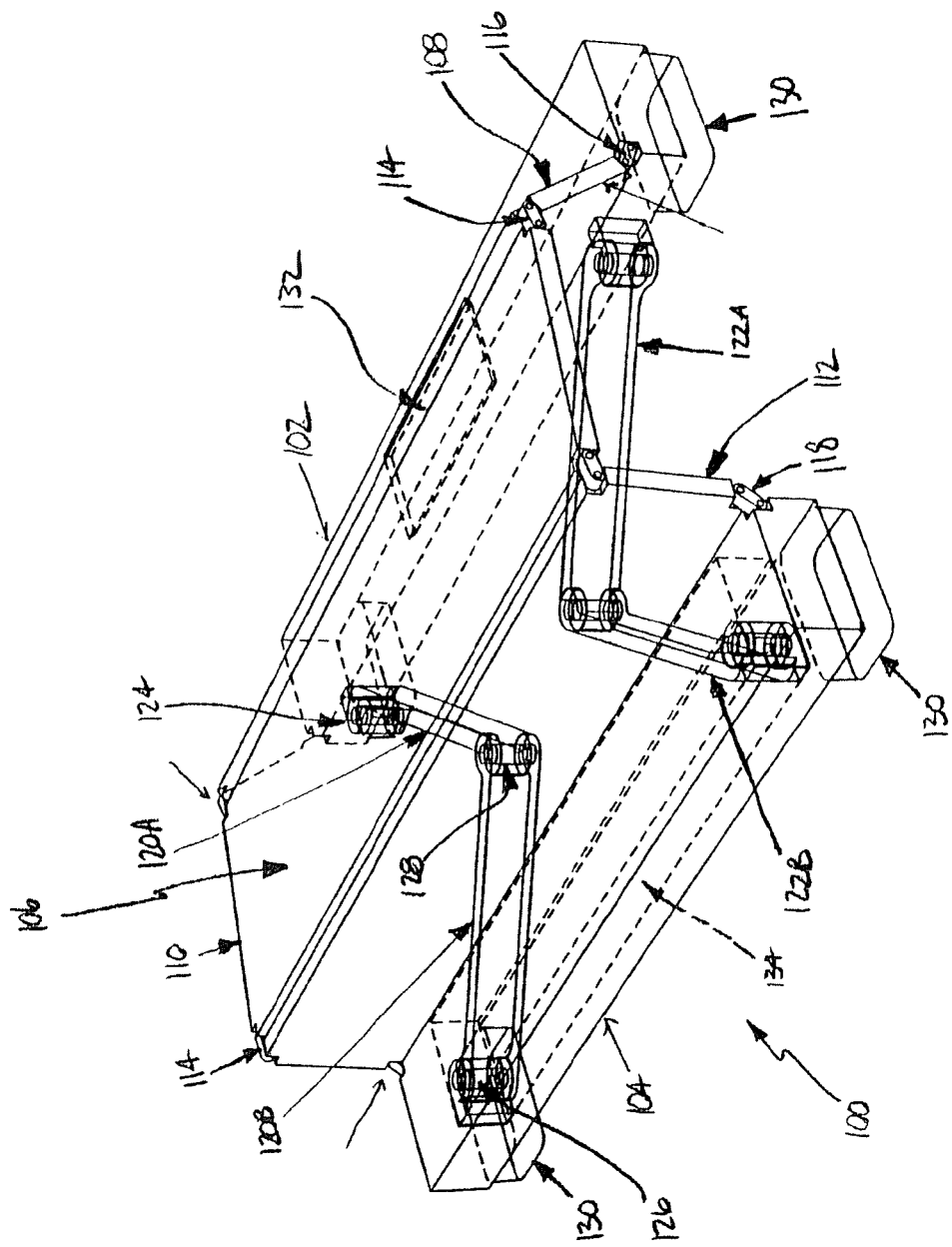
FIG. 2 is a perspective view of the collapsible weighing scale of FIG. 1 shown in a partially collapsed position.
Figure 3:
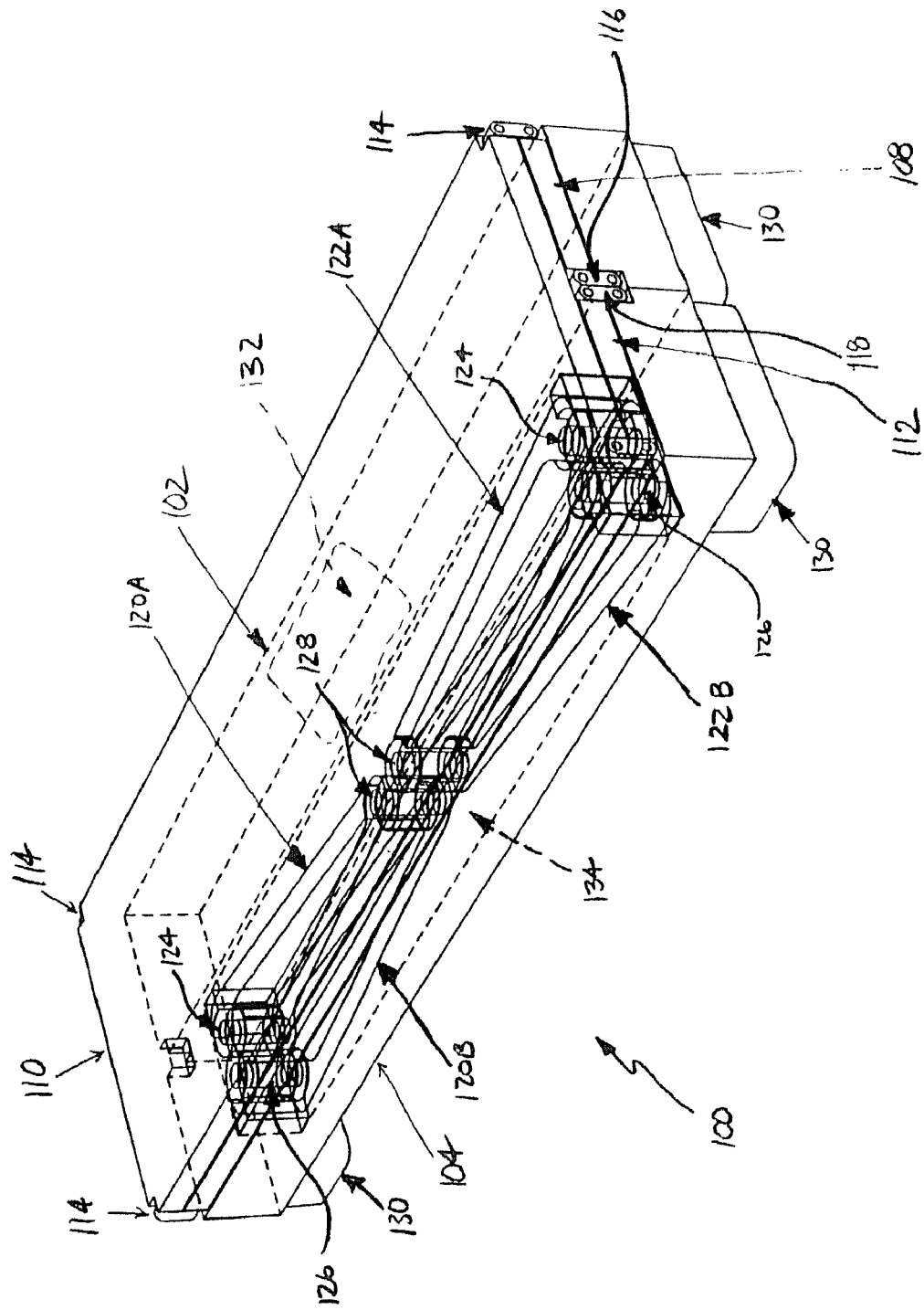
FIG. 3 is a perspective view of the collapsible weighing scale of FIG. 1 shown in a fully collapsed position.

Referring now in greater detail to the drawings, wherein the showings are for the purpose of illustrating preferred embodiments of the invention only and not for the purpose of limiting the invention, FIGS. 1-3 illustrate a first embodiment of the present invention. It includes a collapsible weighing scale 100 having a support structure that includes a first support member 102 and a second support member 104. A top surface or platform 106 is provided on scale 100 and is formed from platform segments 108, 110 and 112, along with support members 102 and 104. The platform segments are connected to one another by conventional hinges 114. Platform segment 108 is connected to support member 102 by known hinges 116, and platform segment 112 is connected to support member 104 by similar hinges 118. It will be appreciated, however, that platform 106 can be formed by any suitable number of platform segments of any suitable width. For example, support members 102 and 104 and platform segments 108 and 112 can each have a first width dimension W1 of about 2 inches, and platform segment 110 can have a second width dimension W2 that is approximately twice dimension W1 or about 4 inches. It will be further appreciated that the platform segments can be connected or attached to one another and to support members 102 and 104 by any suitable arrangement.

A pair of spaced-apart support beams 120 and 122 extends between support members 102 and 104. Each of the support beams includes a first portion 120A, 122A pivotally attached to support member 102 by a conventional hinge and pin arrangement 124, and a second portion 120B, 122B pivotally attached to support member 104 by a conventional hinge and pin arrangement 126. The two portions of each respective support beam are hingedly connected by any suitable arrangement, such as a known hinge and pin arrangement 128. Feet 130 are supported on support members 102 and 104 and are suitable for contacting and conveying the load to be weighed onto a floor, table or other suitable flat surface. An output device suitable for communicating the full weight of the associated object, such as display 132, for example, is provided on support member 102 for communicating the total weight sensed by the scale.

Scale 100 is shown in FIG. 1 in a deployed, functional or use condition. In this configuration, the scale operates by sensing a load placed onto platform 106 and displaying the total weight of the load on display 132. Platform 106 is formed in part by support members 102 and 104 and by support segments 108, 110 and 112 that are in turn supported on support beams 120 and 122 forming a stable, flat surface to support the load. The load is transferred through support segments 108, 110 and 112 onto support beams 120 and 122 and thereafter to support members 102 and 104. The total load is therefore shared by both support members 102 and 104 which are each supported by two feet 130. The feet contact and convey the load onto the floor. The load is measured by known electronic load sensors (not shown) within the scale. A load sensor can be installed on each foot or between each foot and an associated support member to create an electronic signal that can be directly correlated to the load sensed by each foot. By summing the loads seen at each of the feet and converting that signal into appropriate units, the total weight sensed by the scale can be determined and displayed or otherwise communicated.

FIGS. 1-3, when taken together show scale 100 moving from a fully extended or use condition into a fully collapsed or storage configuration. As first and second support members 102 and 104 are pushed together, the three platform segments 108, 110 and 112 will be displaced upward out of the plane formed as platform 106 by pivoting at hinged connections 114, 116 and/or 118. As support members 102 and 104 continue to be pushed together, hinged connections 116 and 118 respectively cause platform segments 108 and 112 to pivot at hinged connections 114 and rotate into position subjacent platform segment 110. This action continues through the intermediate position shown in FIG. 2 until the fully collapsed configuration as shown in FIG. 3 is reached. As support members 102 and 104 are pushed together, support beams 120 and 122 are also displaced such that portions A and B pivot relative to one another about hinge and pin arrangement 128 and relative to support members 102 and 104 respectively about hinge and pin arrangements 124 and 126. Portions A and B of support beams 120 and 122 continue to fold against one another as the support members are pushed together until the scale is fully collapsed and portions A and B are respectively received within a pocket 134 respectively within support members 102 and 104. Once in the stored configuration, the scale can be held together in any suitable manner, such as by a reclosable fastener or by being placed in an enclosure or bag to prevent inadvertent deployment of the scale.

It will be appreciated that the extension of the scale can be completed in one action. As support members 102 and 104 are pulled apart, the platform segments and support beams unfold and extend relative to one another until a fully extended position is reached.

Figure 4:
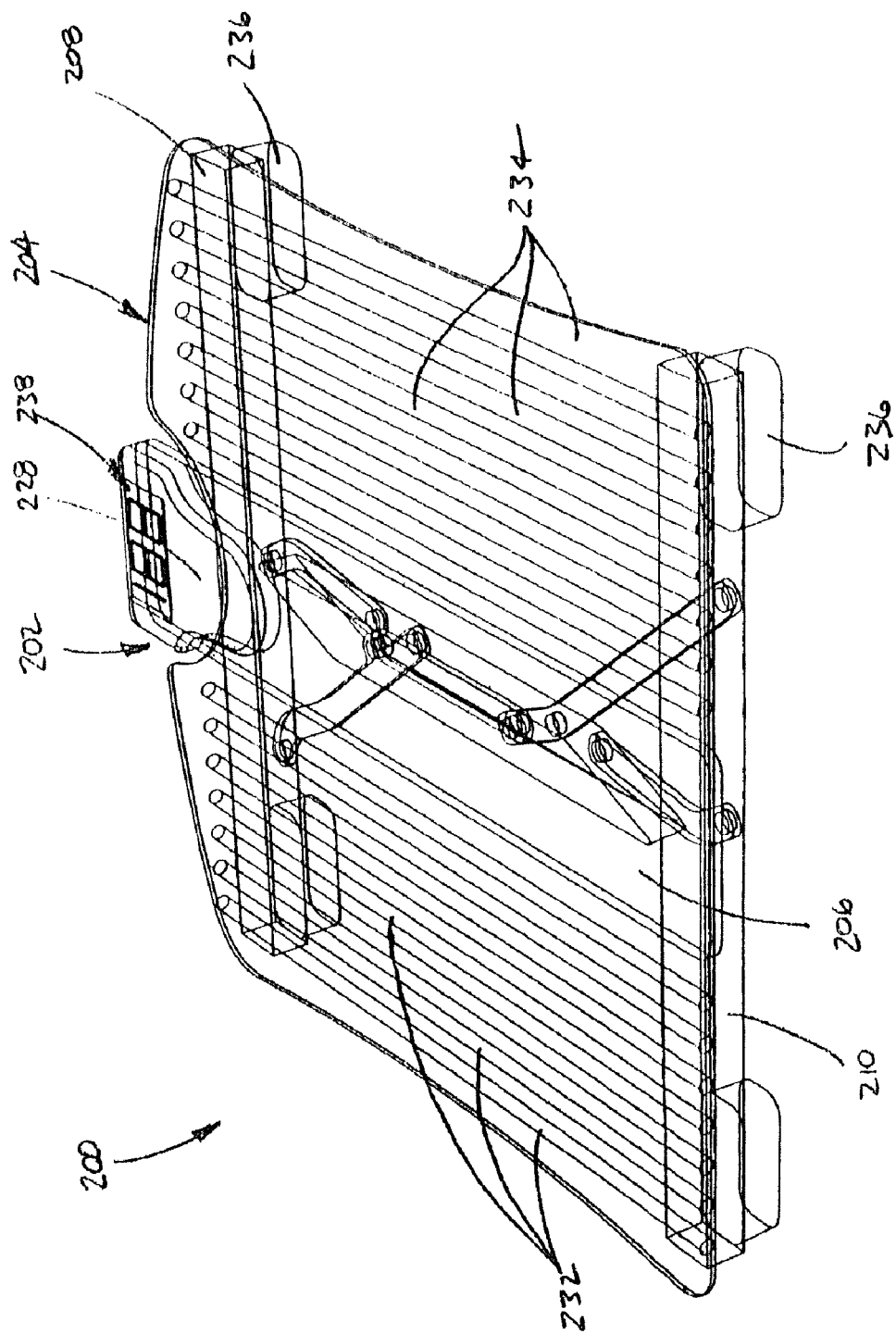
FIG. 4 is a perspective view of a second embodiment of a collapsible weighing scale in accordance with the present invention shown in an extended position.
Figure 5:
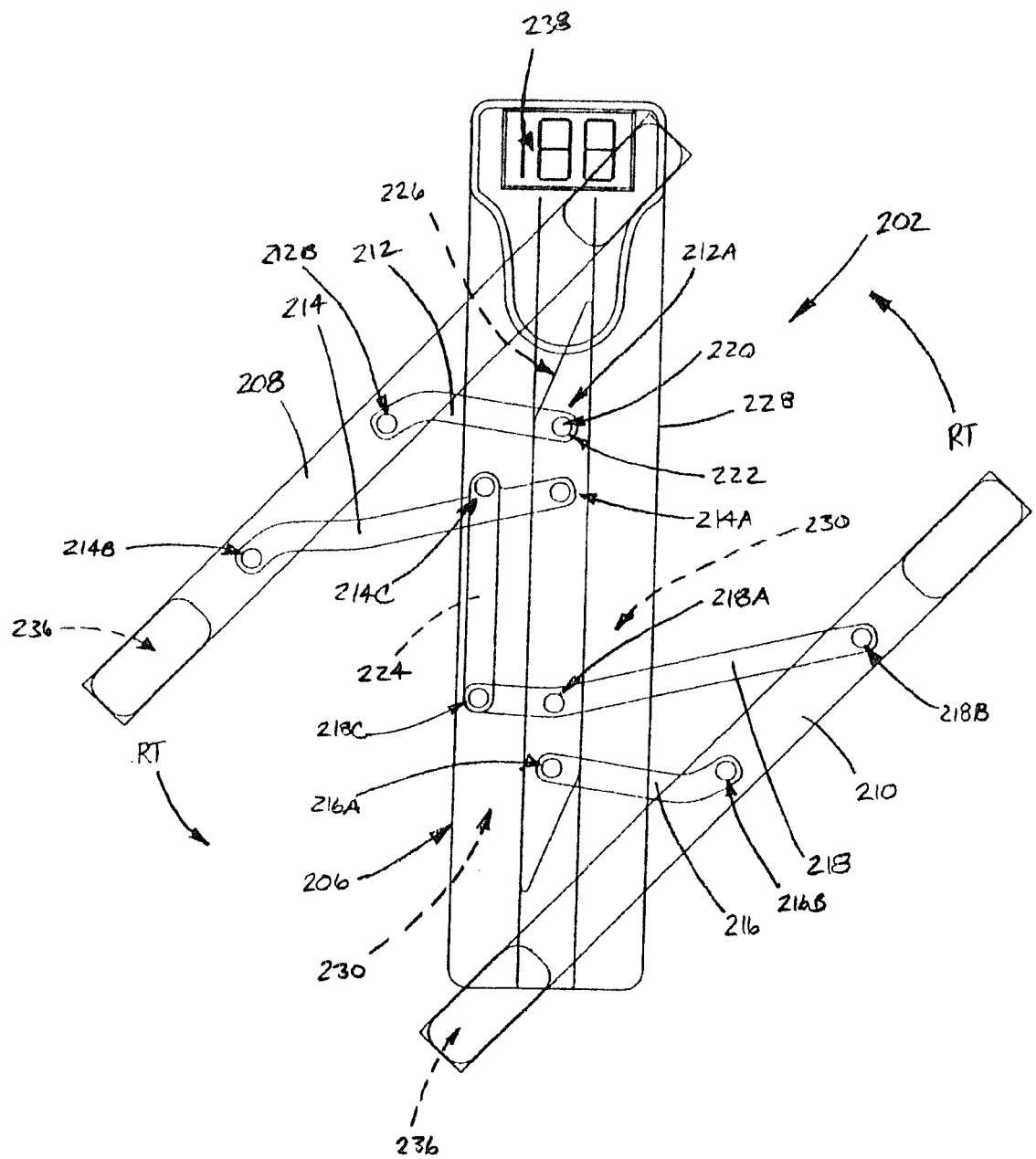
FIG. 5 is a top plan view of the support structure of the collapsible weighing scale of FIG. 4 shown in a partially collapsed position.
Figure 6:
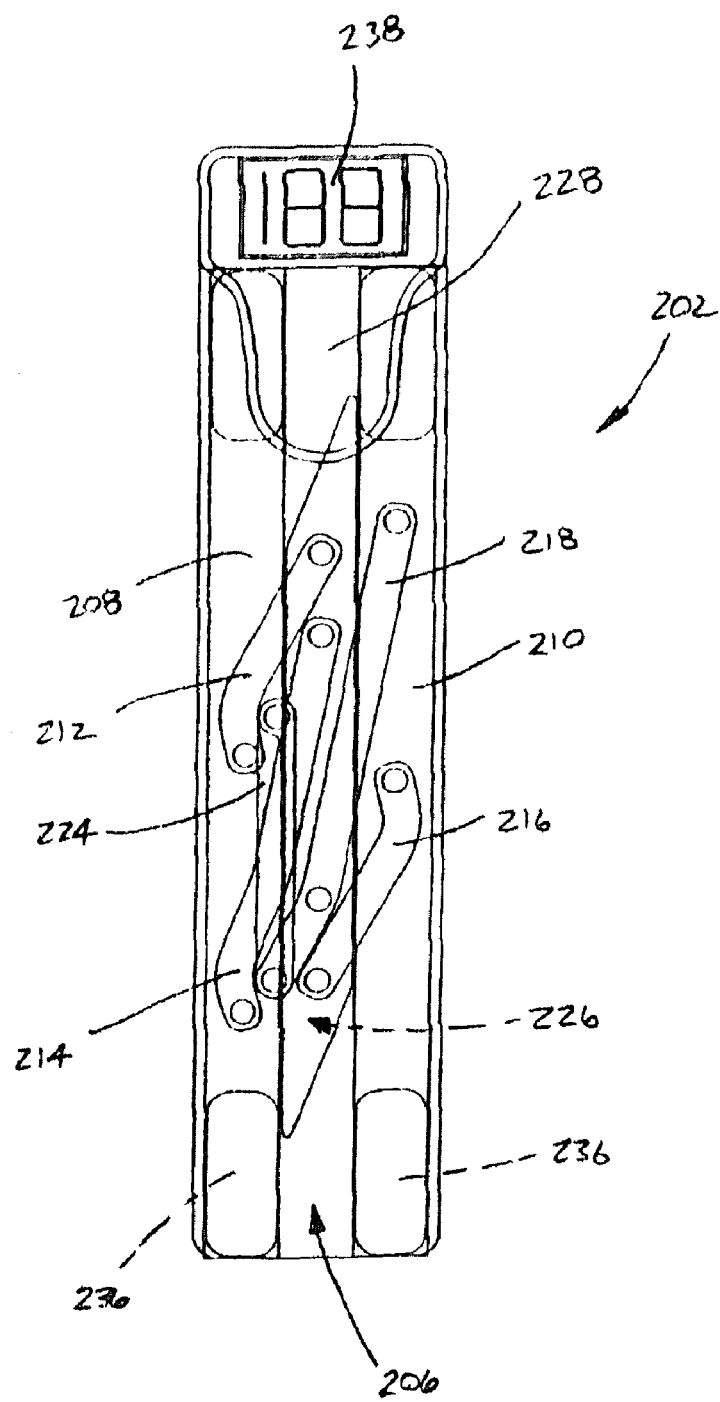
FIG. 6 is a top plan view of the support structure of FIG. 4 shown in a fully collapsed position.

A collapsible weighing scale 200 in accordance with a second embodiment of the present invention is shown in FIGS. 4, 5 and 6. Scale 200 includes a support structure 202 and a platform 204 mounted on the support structure. In FIG. 4, scale 200 is shown in a deployed configuration suitable for determining and outputting the full weight of an associated object.

Support structure 202 includes a central body or base member 206 and support members 208 and 210 pivotally mounted on the base member. As can be seen in FIG. 5, support member 208 is connected to base member 206 by pivot arms 212 and 214. Similarly, support member 210 is connected to the base member by pivot arms 216 and 218. Each of the pivot members are connected to base member 206 at pivot points "A" and are connected to the respective support member at pivot points "B". Pivot points 212A, 212B, 214A, 214B, 216A, 216B, 218A and 218B can be formed by any suitable pivotable connection as are well known in the art, such as a post 220 extending from the base member or one of the support members engaging a hole 222 extending through one of the pivot members at one of the pivot points, for example. A linking member 224 is pivotally interconnected between pivot arms 214 and 218 at pivot points 214C and 218C. Pivot point 214C is disposed along pivot member 214 between pivot points 214A and 214B thereof. Pivot point 218C is disposed along pivot member 218 adjacent pivot point 218A opposite from pivot point 218B. It will be appreciated that linking member 224 can be pivotally attached to the respective pivot members in any suitable manner, such as by using a post and hole arrangement as discussed above, for example.

A longitudinal projection 226 extends downwardly from a top surface 228 of base member 206, and forms longitudinally extending recesses 230 (FIG. 5) below the top surface that extend along opposing sides of projection 226. In a deployed or extended position of support structure 202, support members 208 and 210 oriented generally transverse base member 206 and extend outwardly from both sides thereof. In a retracted or collapsed position of the support structure, support members 208 and 210 are each respectively received beneath top surface 228 within a different one of recesses 230, as shown in FIG. 6.

When taken together, FIGS. 4-6 illustrate scale 200 moving from the extended position to the collapsed position. During such motion, support members 208 and 210 are displaced relative to base member 206, as indicated by arrow RT in FIG. 5. The support members pivot and rotate relative to the base member, due to the action of the respective pivot arms, such that upon reaching the collapsed position, the support members are substantially aligned with the base member. Linking member 224 acts to ensure that the pivot arms and, therefore, the support members, are displaced together. Furthermore, due to the interconnection of linking member 224 with pivot members 214 and 218, displacement of one support member induces simultaneous displacement of the pivot arms and the other support member. The support members move from the collapsed position to an extended position in a substantially similar manner but in the opposing direction. As such, the support structure can be substantially deployed or collapsed in one movement.

Scale 200 also includes a plurality of platform segments, such as rods 232, for example, and a flexible material 234, such as a woven or polymeric material, for example, interconnecting the platform segments to form platform 204, as shown in FIG. 4. The platform is secured to the support structure in a suitable manner, such as using a fastener (not shown), for example. In the deployed configuration, platform 204 extends outwardly from base member 206 such that rods 232 are supported on the support members forming a substantially horizontal surface for receiving the associated object to be weighed. In the collapsed configuration, the platform can be wrapped around the support structure and secured thereto in a suitable manner, such as using a recloseable fastener (not shown), for example.

Scale 200 includes a foot 236 on each end of each support member 208 and 210. Feet 236 are suitable for contacting and conveying the load of the associated object to a floor or other surface. The total load of the associated object is conveyed to the feet from the support members and, as such, is shared by each of feet 236. The load is measured by suitable known electronic load sensors (not shown). The load sensors can be formed within each foot or installed between the support member and each foot. The load sensors create an electronic signal that can be directly correlated to the load sensed by each foot. Using suitable electronics well known to those skilled in the art, the loads seen at each foot are summed and converted into appropriate units representing the total load. A signal correlated to the total load is output to a suitable output device, such as a display 238, for example.

Figure 7:
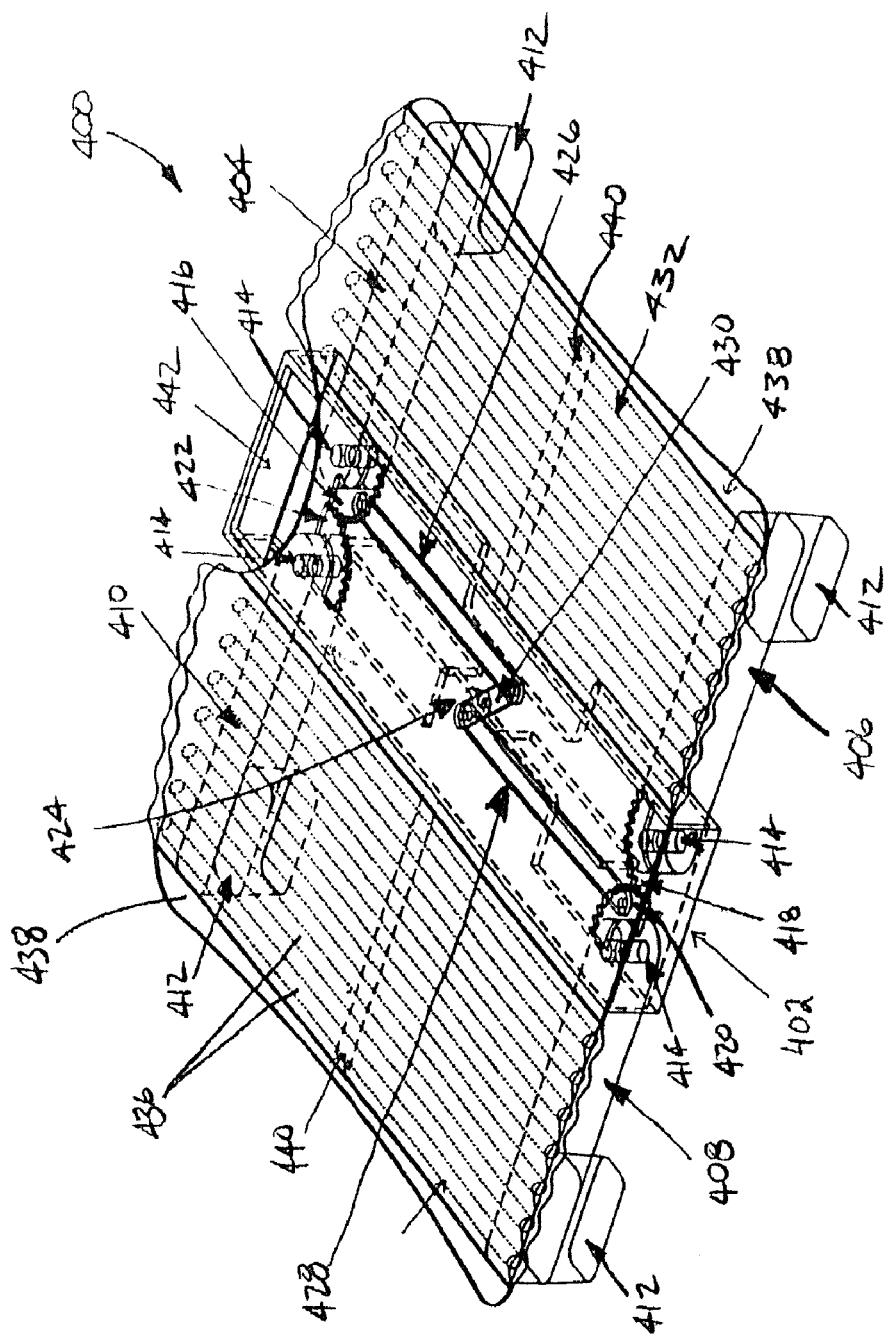
FIG. 7 is a perspective view of a third embodiment of a collapsible weighing scale in accordance with the present invention shown in an extended position.
Figure 8:
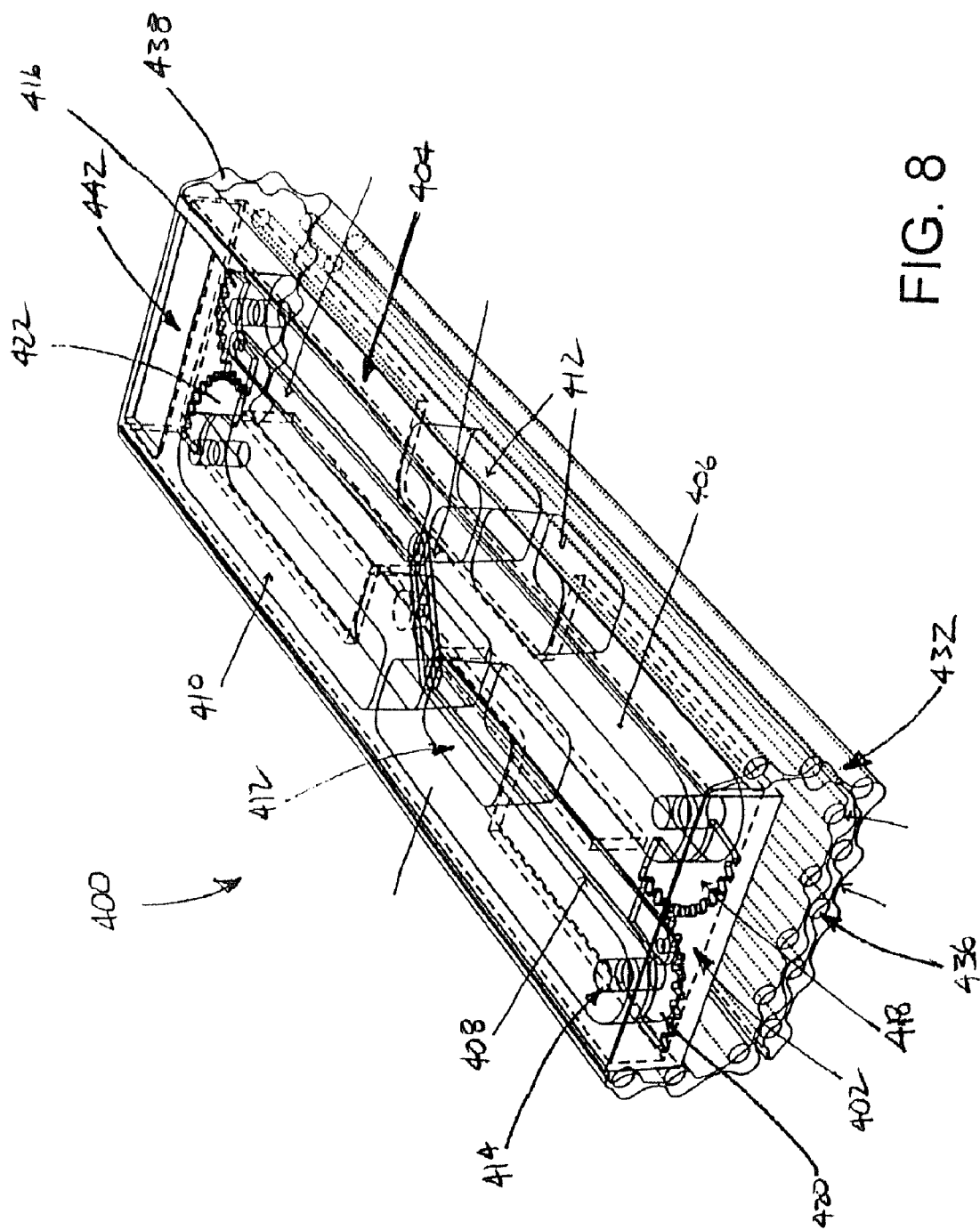
FIG. 8 is a perspective view of the collapsible weighing scale of FIG. 7 shown in a collapsed position.
Figure 9:
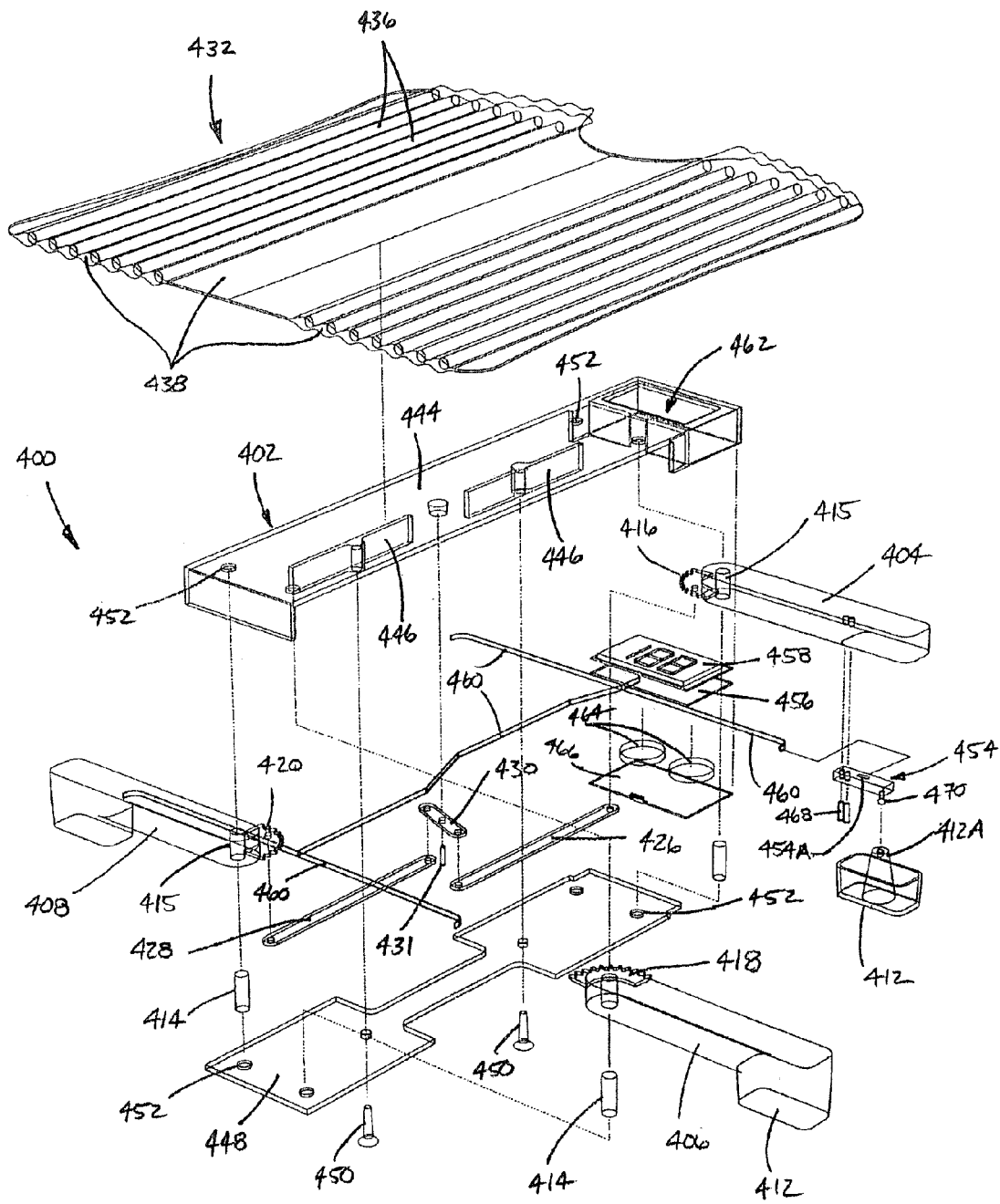
FIG. 9 is an exploded perspective view of the collapsible weighing scale shown in FIG. 7.

Still another collapsible weighing scale 400 in accordance with the present invention is shown in FIGS. 7, 8 and 9. Scale 400 includes a support structure that has an elongated base member or central body 402 and legs 404, 406, 408 and 410 (leg 410 is not shown in FIG. 9) that are pivotally mounted on central body 402. A foot 412 is mounted on each of the legs for engaging a floor, table or other flat subjacent surface. Each of the legs is mounted on central body 402 by a suitable pivot arrangement, such as by a pivot post 414 supported on central body 402 that engages a pivot hole 415 (FIG. 9) in each of the legs. Gear segments 416, 418, 420 and 422 are each respectively defined on legs 404, 406, 408 and 410. Gear segment 416 of leg 404 interengages gear segment 422 of leg 410 such that pivotal rotation of one leg between a retracted and an extend position results in simultaneous displacement of the other leg in the opposite direction. Similarly, gear segments 418 and 420 of legs 406 and 408, respectively, interengage one another and likewise move simultaneously in opposite directions to one another as one of the legs is displaced. As such, when one of legs 404 and 410 is pivotally displaced from a retracted position to a deployed position, or vice versa, the other leg will likewise be repositioned. Legs 406 and 408 are configured and operate in the same manner.

Gear segments 416 and 420 are connected by a linkage arrangement 424 that extends therebetween and includes a first member 426, a second member 428 and a pivot member 430 that is pivotally supported along central body 402 in a suitable manner, such as by a pivot post 431 secured to central body 402, for example. First member 426 extends between gear segment 426 and one end of pivot member 430. Second member 428 extends between gear segment 420 and the opposing end of pivot member 430. First and second members 426 and 428 are pivotally connected, such as by using a suitable post and hole arrangement, for example, between a respective gear segment and the pivot member such that the rotational displacement of gear segment 416 around pivot post 414 is reacted to gear segment 420 through linkage arrangement 424 causing rotational displacement of gear segment 420. As such, each of legs 404, 406, 408 and 410 are pivotally linked to one another so that rotational displacement of one about an associated pivot post induces a corresponding rotational displacement of each of the remaining legs.

Central body 402 includes a top wall 444 and longitudinal projections 446 extending downwardly from top wall 444. Additional projections, bosses, holes and/or other features can also be provided on central body 402, as desired. A bottom wall 448 is secured to central body 402 in a suitable manner, such as by using fasteners 450, for example. Top wall 444 and bottom wall 448 each include holes 452 for receiving and retaining each of pivot posts 414, such as by using a press fit, for example. However, it will be appreciated that any suitable arrangement for retaining the pivot posts can be used. Longitudinally extending cavities (not numbered) are formed along opposing sides of projections 446 between top wall 444 and bottom wall 448. In the retracted or collapsed configuration, legs 404, 406, 408 and 410 are received within one of the respective cavities to achieve the compact form of the support structure.

Scale 400 also includes a platform 432 supported on the support structure and suitable for receiving an associated object to be weighed. Platform 432 is secured to central body 402 and in an extended position, shown in FIGS. 7 and 9, is supported on legs 404, 406, 408 and 410. Platform 432 includes a plurality of platform segments, such as rods 436, for example. The platform segments are interconnected by a suitable flexible material 438, such as a woven material or a polymeric film, for example. Platform 432 can optionally be formed from two portions that are separately secured to the central body. Scale 400 also optionally includes springs 440 extending from central body 402 that can be used to support platform 432 to keep the extended portions thereof out of the way during deployment and retraction of legs 404, 406, 408 and 410. Once the legs are retracted and stowed within central body 402, as shown in FIG. 8, platform portions 432 and 434 can be folded or otherwise formed around the central body with sufficient force to overcome the bias of springs 440, if such springs are included. The platform can be retained in the collapsed position in any suitable manner, such as by a removable strap (not shown), for example.

Each embodiment herein of a scale in accordance with the present invention, including scales 100, 200 and 400 and scales 600 and 700 discussed hereinafter, includes a suitable load sensing apparatus and an output device. The load sensing apparatus is preferably adapted to output a signal corresponding to the total weight of the associated object to the output device that, in turn, communicates the total weight, either visually, audibly or both, to the user. One example of a suitable load sensing apparatus is shown in and hereinafter discussed with reference to FIG. 9, which illustrates scale 400. However, it is to be specifically understood that this is merely one example of a load sensing apparatus and that any suitable load sensing apparatus or arrangement can be used without departing from the principles of the present invention. What's more, it will be further understood that this or any other suitable load sensing apparatus can be used in association with any suitable collapsible scale including, but not limited to, those embodied, shown and/or described herein.

One suitable load sensing apparatus is shown in FIG. 9 and includes a plurality of load cells in electrical communication with suitable electronic circuitry 456. It will be appreciated that load cells are well known and commonly used. As such, any suitable load cell can be used, including a shear beam load cell 454, for example. Load cells 454 are secured to each leg in a suitable manner, such as by using fasteners 468, for example. Each foot 412 is secured to the associated load cell through a self-leveling joint 412A by a fastener 470. Each load cell outputs a signal correlated to the portion of the total load supported by its associated foot. The signal from each load cell is communicated to the electronic circuitry, which sums or otherwise determines the total load based on the individual signals. Preferably, the electronic circuitry includes a microprocessor (not shown) or other suitable device for determining the total load of the associated object and outputting a signal to the output device, such as display 458, for example, that is correlated to the total weight of the object. Load cells 454 can include one or more strain gauges 454A that are in electrical communication with circuitry 456 through flexible wires 460. Central body 402 includes a chamber 462 suitable for housing the electronic circuitry and display. The load sensing apparatus is powered by one or more batteries 464 that are secured with chamber 462 by a cover 466. Display 458 is preferably positioned within chamber 462 such that it is visible from above the scale.

In operation, the portion of the total load that is sensed by each foot is communicated to the electronic circuitry as a signal that is directly correlated to that portion of the load. The electronic circuitry sums the load from each foot, or otherwise determines the total load, and outputs a signal correlated to the total weight of the object to the output device.

Figure 10:
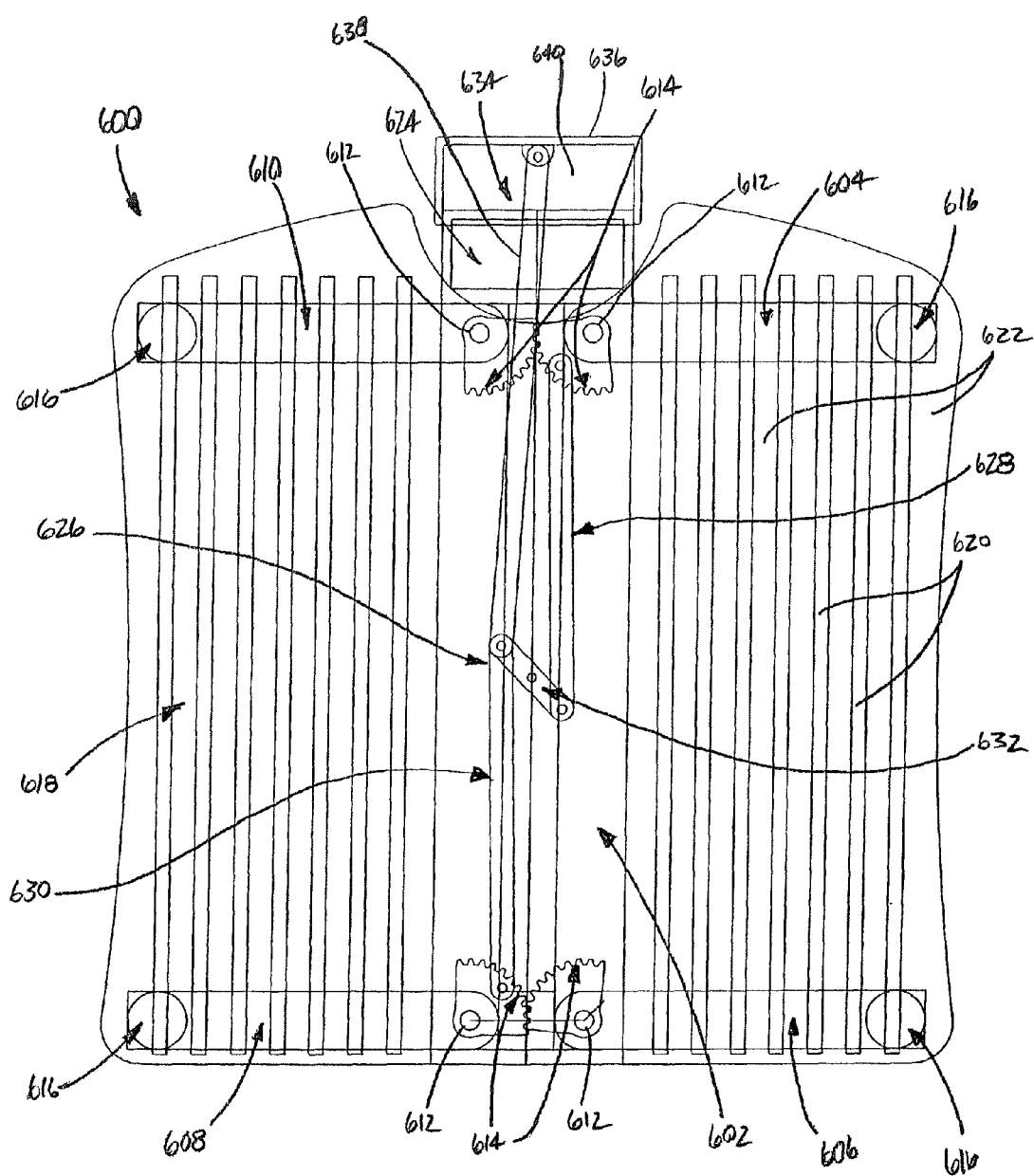
FIG. 10 is a top plan view of a fourth embodiment of a collapsible weighing scale in accordance with the present invention shown in an extended position.
Figure 11:
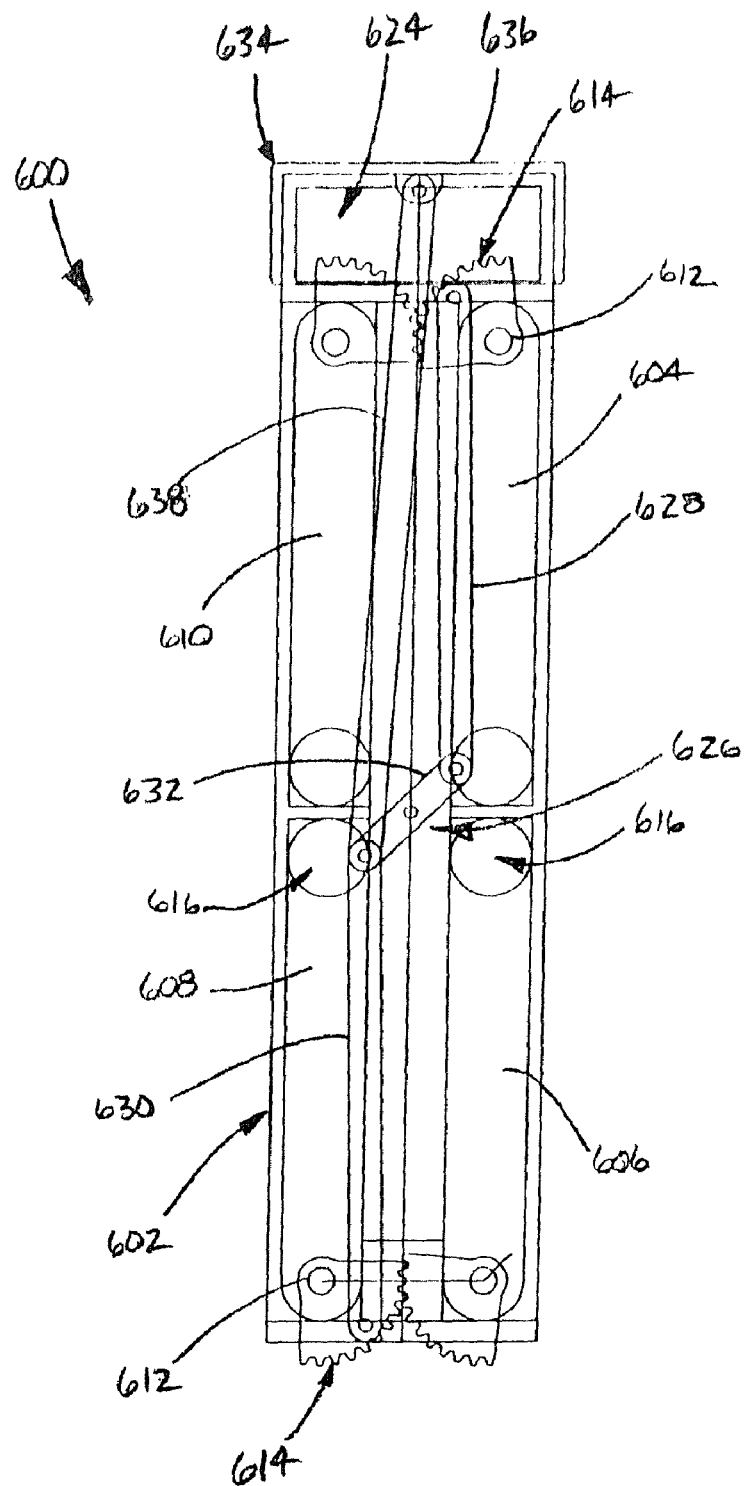
FIG. 11 is a top plan view of the support structure of the collapsible weighing scale in FIG. 10 shown in a collapsed position.

Still another embodiment of a collapsible weighing scale 600 in accordance with the present invention is shown in FIGS. 10 and 11. It will be appreciated that scale 600 is substantially similar to collapsible weighing scale 400 shown in and described with regard to FIGS. 7, 8 and 9. Collapsible scale 600 includes a support structure having an elongated base member or central body 602 and legs 604, 606, 608 and 610 that are rotatably supported on body 602. Each leg has a pivot hole 612 at one end thereof and is suitably supported on central body 602 for rotational movement about the pivot hole, such as by a pin (not shown), for example.

A gear segment 614 is associated with each leg and is spaced radically outwardly from pivot hole 612. It will be appreciated that gear segments 614 are rotatably fixed relative to the associated leg such that rotation of the gear segment about pivot hole 612 causes the associated leg to rotate with the gear segment. A foot 616 is supported at a distal end of each leg opposite the pivot hole therein.

An electronic load sensor is installed on each foot or between each foot and the associated leg and creates an electronic signal directly correlated to a load sensed by the foot. The signals from each load sensor are summed and a total load signal is transmitted to display 624, which in turn outputs the total load in appropriate units. A platform 618 extends from central body 602 and includes a plurality of platform segments, such as elongated rods 620, for example. A flexible material 622 interconnects segments 620 and can be formed from any suitable material or combination of materials, such as a woven material or a polymeric film, for example.

In the extended or deployed position shown in FIG. 10, legs 604, 606, 608 and 610 extend generally transverse elongated central body 602. Platform segments 620 extend generally along central body 602 and are supported between the associated legs forming a generally flat platform for receiving the load.

A linkage arrangement 626 is supported on central body 602 and includes a first member 628, a second member 630 and a pivot member 632. The first and second members 628 and 630 extend between two different gear segments 614 and opposing ends of pivot member 632, which is pivotally supported on central body 602. An actuator 634 is also provided on scale 600 and includes an actuator handle 636 and a connector member 638 extending between handle 636 and pivot member 632. Actuator handle 636 is slidably supported on central body 602 adjacent display 624 and includes a cover wall 640 that extends over and protects the display when scale 600 is in a collapsed position. It will be appreciated that handle 636 moves between an extend position, shown in FIG. 10, in which the legs of scale 600 are extended or deployed, and a retracted position, shown in FIG. 11, in which the legs of 600 are retracted into a collapsed position.

In moving between the extended and retracted positions, handle 636 forces connector member 638 to rotate pivot member 632 primarily due to the translation of connector member 638. Rotation of pivot member 632 primarily causes translation of first and second members 628 and 630, which in turn rotate the gear segments associated with the first and second members. As these associated gear segment rotate, the corresponding interengaging gear segments likewise rotate and the associated legs move from the extended position shown in FIG. 10 to the collapsed position shown in FIG. 11. As such, the movement of handle 636 from the extended to the retracted position results in all four legs moving from the deployed position shown in FIG. 10 to the collapsed position shown in FIG. 11 in one movement. The scale moves from the collapsed to the deployed position by displacing the handle in the opposite manner.

Figure 12:
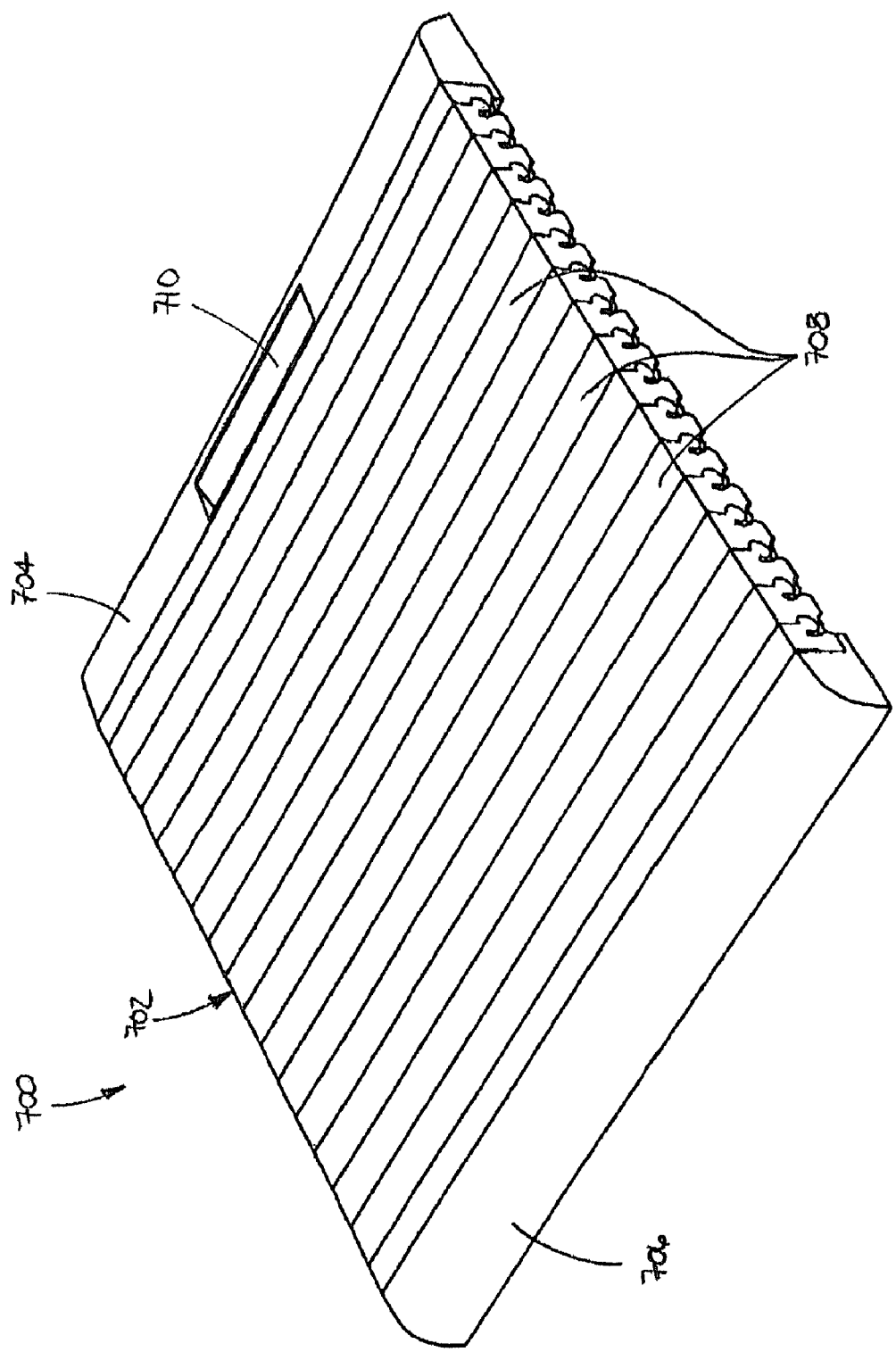
FIG. 12 is a perspective view of a fifth embodiment of a collapsible weighing scale in accordance with the present invention shown in an extended position.

Yet another embodiment of a collapsible weighing scale 700 is shown in and described with reference to FIGS. 12-17. Scale 700 includes a support structure or platform 702 that is formed from first and second support members 704 and 706, and a plurality of platform segments 708 interconnected between the support members. Additionally, scale 700 includes a load sensing apparatus (not shown) and an output device, such as a display 710, for example. The load sensing apparatus is mounted on the support structure and is suitable for providing an output signal of the full weight of an associated object. The output device, such as display 710, is in electrical communication with the load sensing apparatus and receives the output signal therefrom. Display 710 is shown in FIG. 12 as being recessed into first support member 704.

Figure 13:
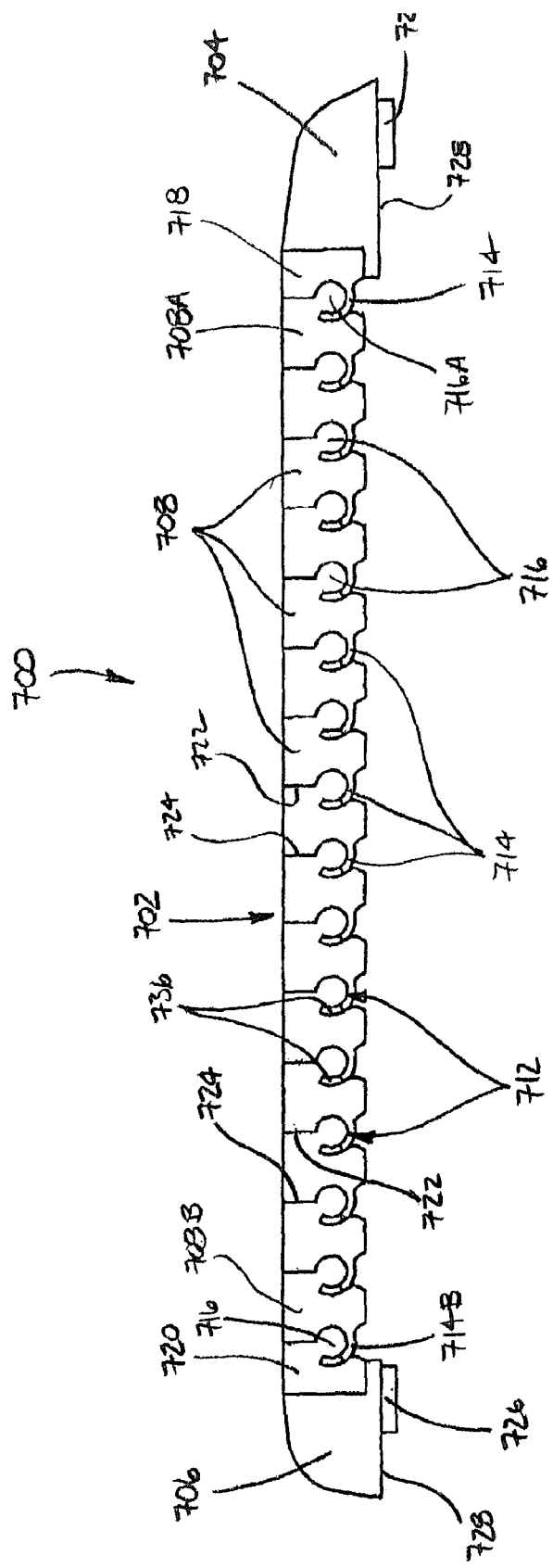
FIG. 13 is a side elevation view of the collapsible weighing scale shown in FIG. 12.
Figure 14:
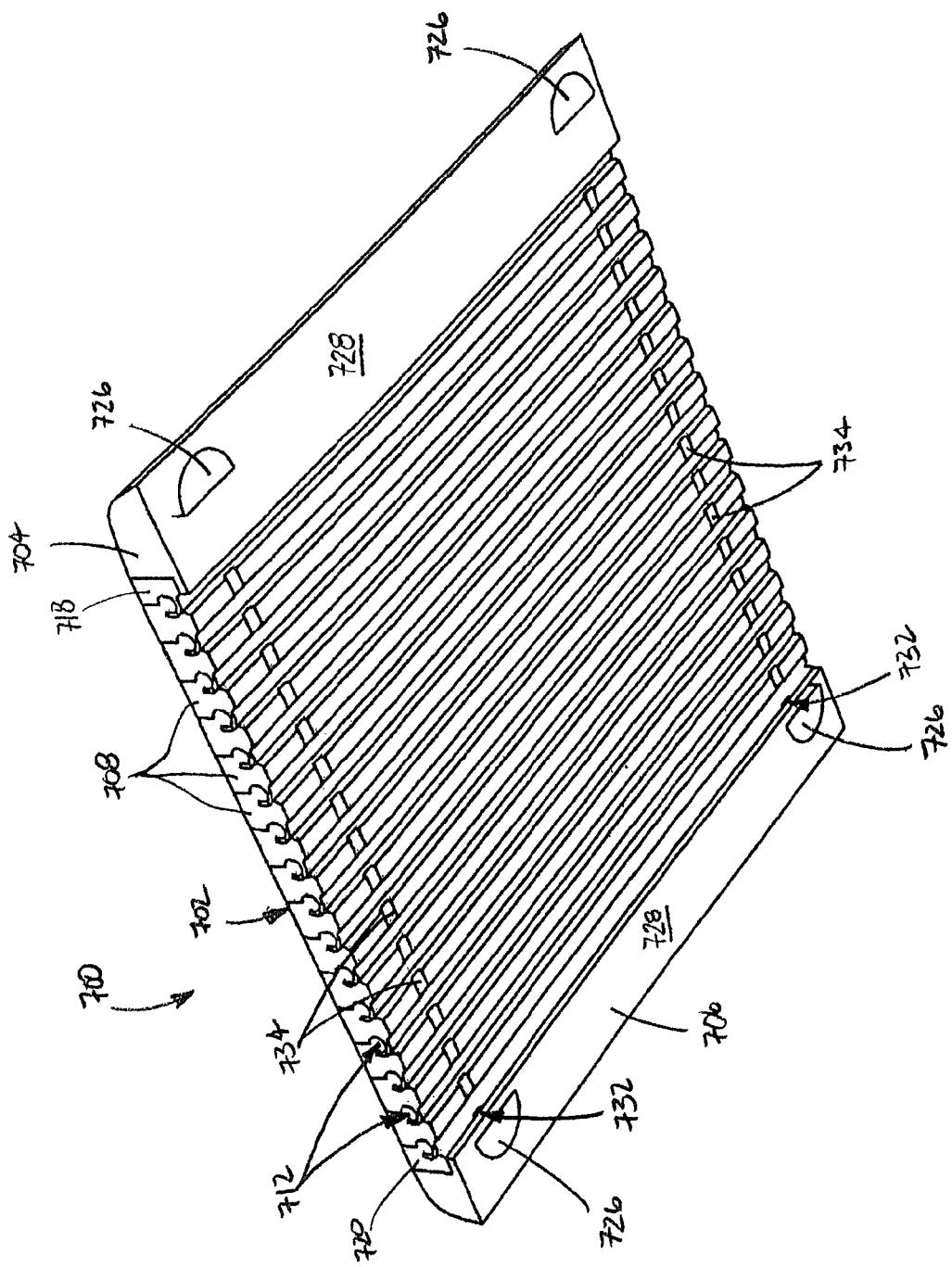
FIG. 14 is a bottom perspective view of the collapsible weighing scale shown in FIG. 12.
Figure 15:
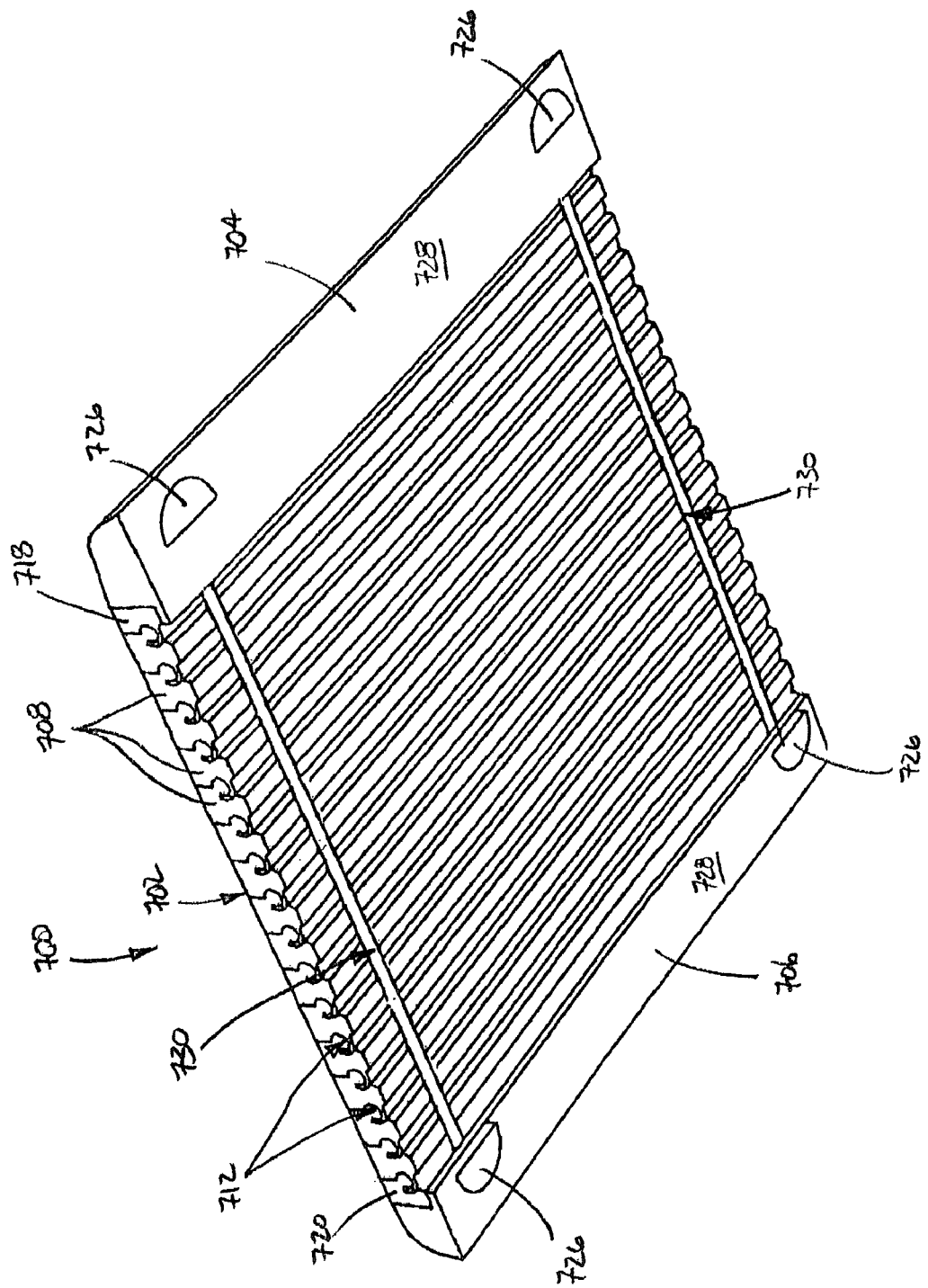
FIG. 15 is the bottom perspective view of the collapsible weighing scale in FIG. 14 shown with optional support bars.

Turning to FIG. 13, each of platform segments 708 is interconnected to the adjacent platform segments by joints 712. Each platform segment 708 includes a socket 714 disposed along a first portion thereof and a cylindrical bead or rail 716 extending along an opposing portion thereof and generally parallel with the socket. It will be appreciated, however, that any suitable feature or configuration for pivotally joining adjacent platform segments can be used without departing from the scope and intent of the present invention. For example, a series of bead segments extending along each platform segment, or a plurality of spherical balls disposed along the platform segments, could be used. Connecting elements 718 and 720 pivotally connect the plurality of platform segments between support members 704 and 706, respectively.

The connecting elements can be secured to the respective support members in any suitable manner, such as by using fasteners and/or adhesives, for example. Alternately, connecting elements 718 and 720 can be integrally formed on the respective support members. Connecting element 718 includes a socket 714 extending along the length thereof generally opposite support member 704. Connecting element 720 includes a generally cylindrical bead or rail 716 extending therealong generally opposite support member 706. As such, a first platform segment 708A is pivotally connected to connecting element 718 by socket 714 of the connecting element receiving rail 716A of platform segment 708A. Socket 714B of the last of the plurality of platform segments 708B is pivotally interconnected to connecting element 720 by socket 714B of the platform segment receiving rail 716 of the connecting element.

In the deployed or extended position shown in FIGS. 12-15, rail 716 of each platform segment 708 is received into a corresponding socket 714 on the next immediately adjacent platform segment. Except, that is, for platform segment 708A for which the rail thereof is received in the socket of connecting element 718. Additionally, rail 716 of connector element 720 is received in socket 714B of platform segment 708B.

Each of platform segments 708 includes side walls 722 and 724 extending longitudinally along the lengths thereof. It will be appreciated from FIG. 13 that side wall 722 extends adjacent rail 716, and side wall 724 extends adjacent socket 714 of each platform segment. As such, in the deployed or extended position, side wall 722 of one platform segment abuts against side wall 724 of the adjacent platform segment preventing further rotation of the joint that extends therebetween. The side walls 722 and 724 are preferably of the same height on all platform segments 708 so as to provide a flat support surface or platform when scale 700 is in its extended position.

It will be appreciated that in this embodiment, platform segments 708 and joints 712 therebetween substantially bear the weight of the person or object situated thereon. The weight is distributed to support members 704 and 706 which are supported on a subjacent surface (not shown) each by one or more feet 726 mounted on a bottom surface 728 thereof. An electronic load sensor (not shown) is typically positioned on each foot 726 or alternatively positioned between each foot 726 and the associated support member. Each load sensor creates an electronic signal that is correlated to the load sensed by its associated foot. Using suitable electronics, known by those skilled in the art, the individual signals from the electronic load sensor of each foot are combined or summed, and the resulting total signal is converted into appropriate units for displaying the total weight sensed by the scale, which is thereafter suitably output, such as on display 710, for example.

It is important that the platform segments and corresponding joints therebetween do not buckle under the weight of the associated object supported thereon, and that the platform segments are not in contact with the subjacent surface that supports feet 726. This would undesirably affect the weight sensed by the load sensors and cause the scale to render an inaccurate reading of the weight of the associated object. It is apparent from FIG. 16 that platform segments 708 and support members 704 and 706 are spaced away from and do not extend as far down as feet 726. To provide additional structural support to scale 700, stabilizing rods 730, shown in FIG. 15, can optionally be used. The stabilizing rods aid in the prevention of buckling of joints 712 under the weight of the associated object or person. The stabilizing rods can be pivotally attached to one of support members 704 and 706 and fold underneath the respective support member such that the stabilizing rods are out of the way when collapsing scale 700. Alternately, the stabilizing rods can be separate and removable from scale 700. As better seen in FIG. 14, holes 732 can be used to receive opposing ends of the stabilizing rods, where removable stabilizing rods are used. Additionally, notches 734 or any other suitable geometric feature can be optionally provided on platform segments 708 to engage the stabilizing rods.

Figure 16:
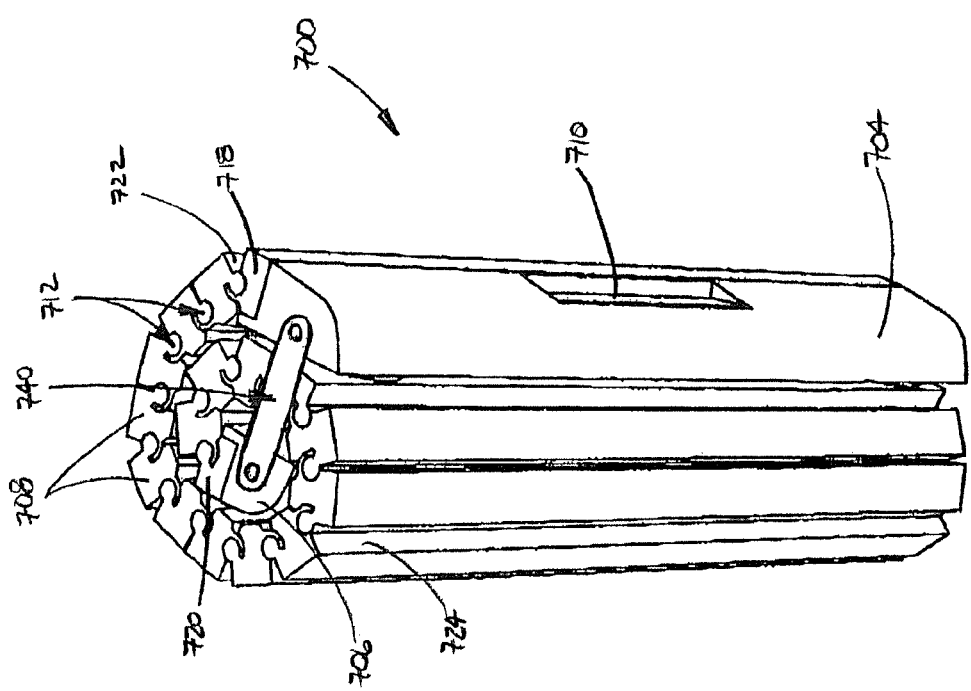
FIG. 16 is a perspective view of the collapsible weighing scale of FIG. 12 shown in a collapsed position.
Figure 17:
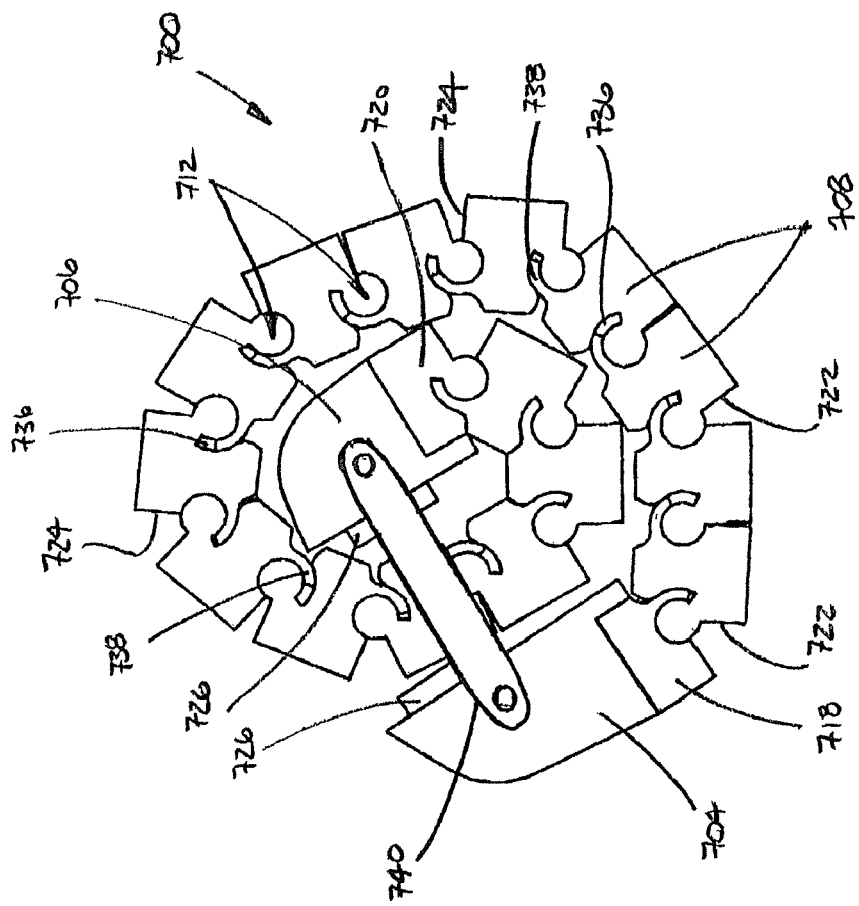
FIG. 17 is an end view of the collapsible weighing scale of FIG. 16.

As shown in FIG. 13, joints 712 include gaps or voids 736. These voids, along with joints 712 allow scale 700 to be rolled up into a collapsed position as shown in FIGS. 16 and 17. Preferably, the joints have a limited degree of movement to prevent over extension of the electronic elements. The range of movement between adjacent platform segments can be limited by the length of an arm portion 738 of socket 714 and the distance that the same can extend into gap 736. Where 738 is fully inserted into gap 736 of joint 712, the two associated platform segments will generally be able to pivot no further. In the collapsed position, scale 700 can also include a securement device, such as a strap 740 that secures the ends of the support members, for example. It will be appreciated, however, that any suitable securement device can be used, including complementary magnets, elastic bands and/or hook and loop fasteners, for example.

Figure 18:
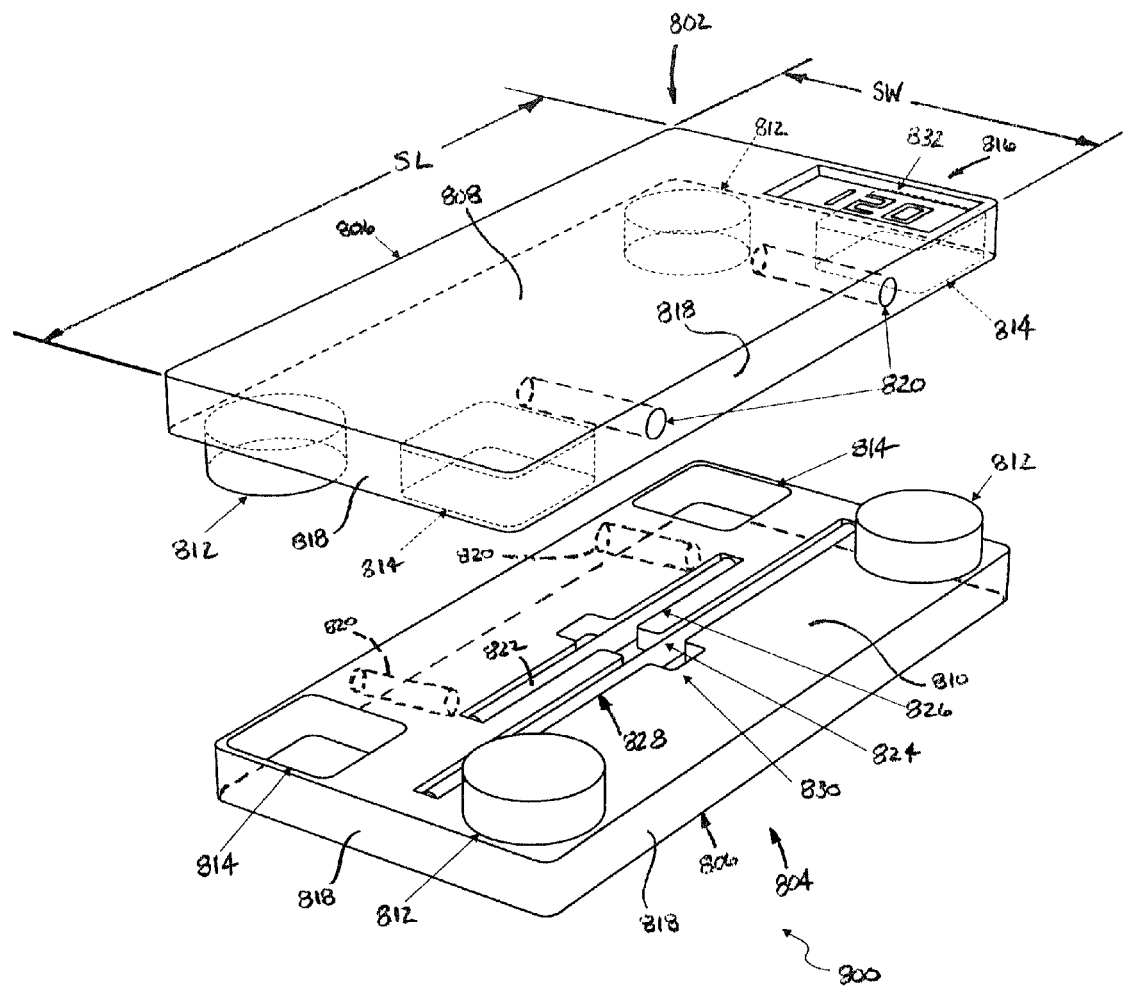
FIG. 18 is an exploded perspective view of a sixth embodiment of a weighing scale in accordance with the present invention shown in a collapsed position.

A further embodiment of an adjustable weighing scale 800 is shown in FIGS. 18-26 that includes a first scale section 802 and a second scale section 804 that is separable from the first scale section. FIG. 18 is an exploded perspective view of scale 800 showing the first and second scale sections separated from one another. FIG. 19 is an exploded side view of the scale in this same arrangement. These exploded views are useful for illustrating features and details of scale 800 that are less visible in a collapsed or compact condition suitable for transport or storage of the scale, such as that shown in FIGS. 20 and 21. In the exemplary embodiment shown, scale 800 is shown as having a collapsed width approximately equal to the width of the scale sections, as indicated by dimension CW, which may be different than a dimension of one or more of the support platforms.

Scale sections 802 and 804 each include a support platform 806 having an upper side or top surface 808 and an under side or bottom surface 810. In the exemplary embodiment shown, the support platforms 806 are substantially the same size and shape, and are shown having length and width dimensions SL and SW, respectively. It will be appreciated, however, that the support platforms can be of any suitable shape, size and/or configuration. Scale sections 802 and 804 also include at least one foot or surface-engaging member disposed on or along each of support platforms 806. In the present exemplary embodiment, two feet or surface-engaging members 812 are disposed in spaced relation along bottom surface 810 of the support platforms. It should be recognized, however, that this arrangement is merely exemplary and that any other quantity or configuration of surface-engaging members can alternately be used. Recesses 814 extend into support platforms 806 from along bottom surface 810 and are cooperable to receive surface-engaging members 812 from an opposing scale section. Recesses 814 are shown as being approximately square in shape. However, it will be appreciated that any suitable shape or configuration can alternately be used.

Figure 22:
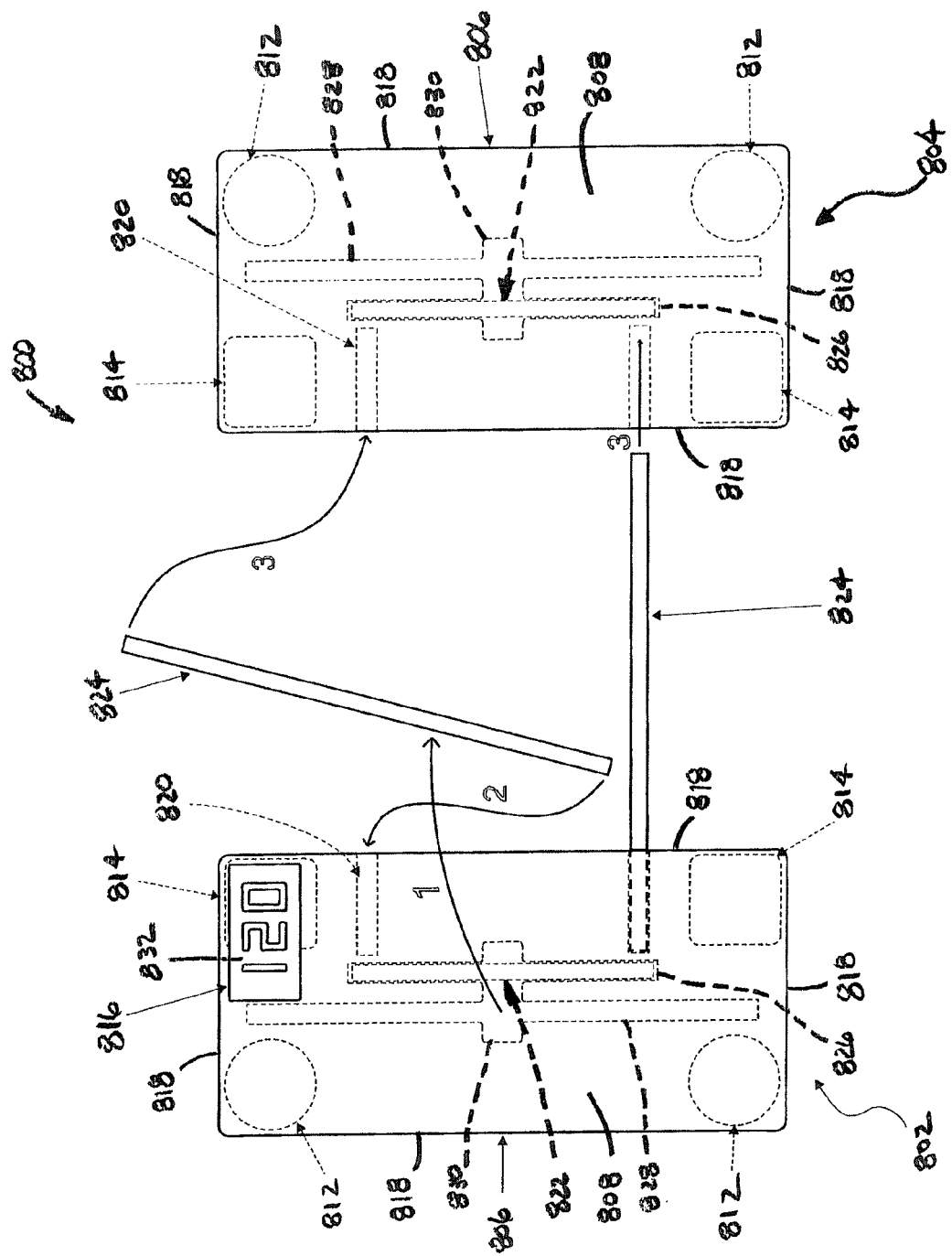
FIG. 22 is a top view of the weighing scale in FIGS. 18-21 shown being assembled into an extended-width position.

Scale 800 includes an output device for communicating the weight of an object to a user. Suitable output devices can communicate the weight visually, audibly or in any other manner or combination of manners. One example of a suitable output device 816 is shown in FIGS. 18 and 22 and is integrated into the support platform of scale section 802. Another example of a suitable output device 816', which is shown in FIGS. 19-21, 23 and 25, is pivotally supported on the support platform of scale section 802. Optionally, output device 816' could be removeably secured on scale section 802 and capable of placement at a distance from the scale section. Output devices 816 and 816' can include any suitable devices and/or components for communicating the weight of an associated object, including, without limitation, an audible output device (e.g., a speaker), a visual output device (e.g., a display), a power source (e.g., a battery), and any suitable operating circuitry and/or processing devices.

Scale sections 802 and 804 include a wall 818 that extends peripherally around support platforms 806 and that extends between surfaces 808 and 810 thereof. One or more connecting features are provided on each scale section to structurally interconnect the same using suitable connecting members. In the exemplary embodiments shown in FIGS. 18-26, such connecting features can include passages 820 that extend into support platforms 806 from along edges 818. Passages 820 are shown as being blind holes that extend into the support platforms. However, it will be appreciated that any other type or configuration of connecting features disposed on or along on any part of the scale sections could alternately be used.

Scale 800 includes one or more connecting members that are used to structurally interconnect the scale sections. In the exemplary embodiment shown, connecting members 822 and 824 are shown as being stored on the scale sections. Connecting members 822 are shown as being of a shorter length than connecting members 824, and can be used to deploy the scale in a normal-width configuration (FIGS. 25 and 26), as compared to an extended-width configuration (FIGS. 23 and 24) which is formed when using connecting members 824. It will be appreciated that the connecting members can be of any suitable length, and that other sets of connecting members having other, different lengths can optionally be provided. Additionally, the connecting members can optionally include a telescoping or otherwise extendable-length configuration. Storage channels 826 and 828 are formed on the support platforms of the scale sections and extend thereinto from along bottom surface 810 of the support platforms. Storage channels 826 and 828 respectively receive connecting members 822 and 824 when the same are not in use. An access opening 830 extends across channels 826 and 828 and is suitable for providing access to the connecting members to facilitate insertion and removal of the same to and from the channels.

To place the scale into a usable condition, such as the extended-width position shown in FIGS. 23 and 24 or the normal or full-width position shown in FIGS. 25 and 26, for example, one or more of the connecting members are secured on or between the scale sections to structurally interconnect the same, such as by engagement of the connecting members with connecting features that are provided on opposing scale sections, for example. In the exemplary embodiment shown in FIG. 22, connecting members, such as connecting members 824, for example, are removed from corresponding storage areas, such as storage channels 828, for example, as indicated by Arrow 1. Thereafter, each end of the connecting members can engage suitable connecting features, such as by inserting each end into a different one of passages 820, for example, which may be provided on support platforms 806 of scale sections 802 and 804, for example, as indicated by Arrows 2 and 3. The connecting members and/or connecting features can optionally include suitable retaining features (not shown), such as detents and spring-biased retainers for engaging the detents, for example, that are operative to retain the connecting members in engagement with the connecting features and/or to indicate when the connecting members and connecting features have been fully engaged.

Figure 27:
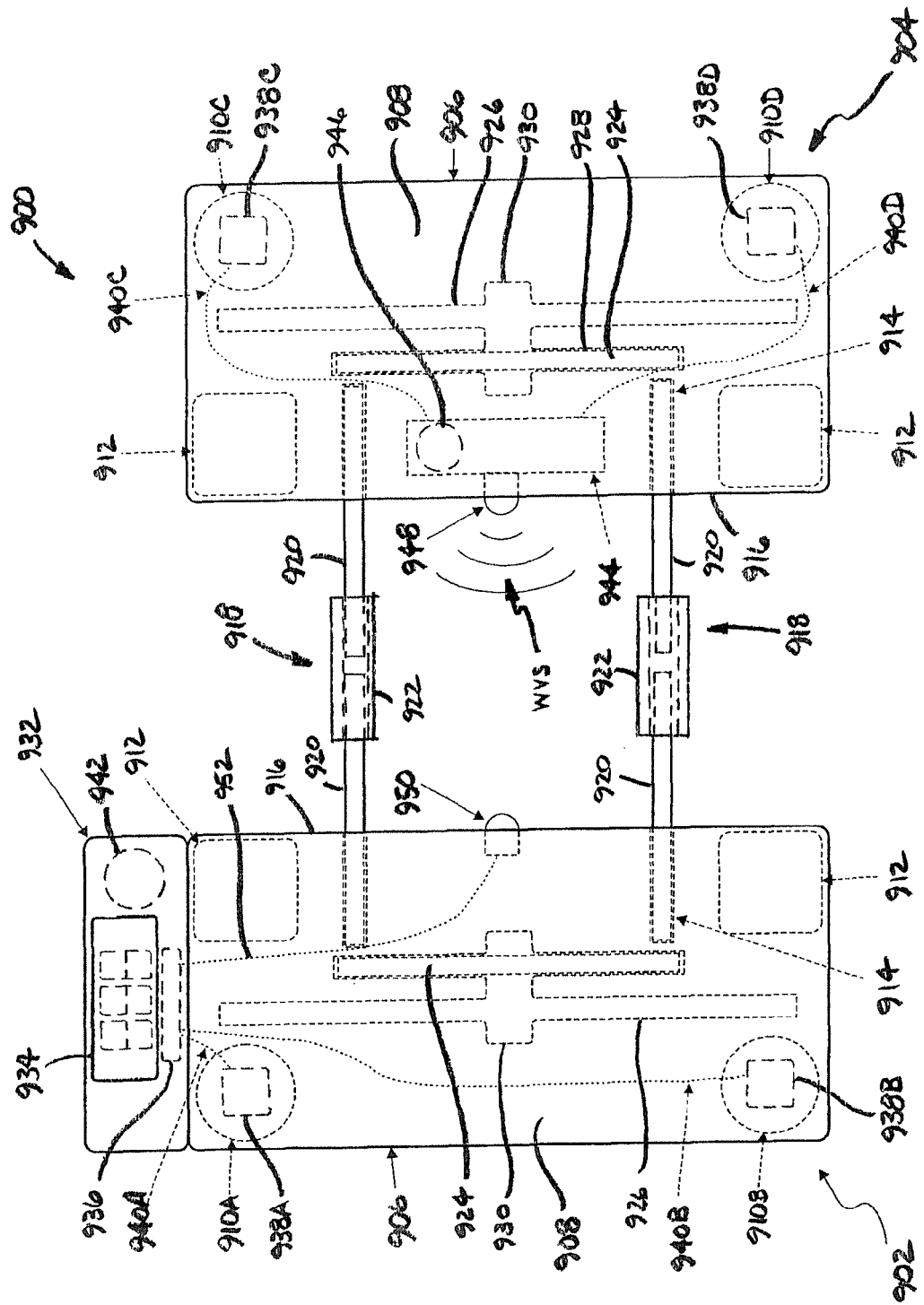
FIG. 27 is an alternate embodiment of the weighing scale in FIGS. 18-26 shown in an extended-width position.

As shown in FIG. 23, scale sections 802 and 804 are disposed in an extended-width configuration when a longer set of connecting members, such as connecting members 828, are used, as indicated by dimension W3. Alternately, connecting members 822 can be used to structurally interconnect scale section 802 and 804, and to deploy the scale into a useable condition, such as the normal-width position shown in FIGS. 25 and 26 which is indicated by dimension W4. It will be appreciated that for purposes of clarity of illustration, the scale sections in FIGS. 25 and 27 are shown having an exaggerated spacing from one another. In one embodiment, the scale sections will be adjacent one another or in abutting engagement when deployed in the full-width configuration. As such, the width dimension W4 can be approximately the width dimension of the first scale section plus the width dimension of the second scale section.

Similar to the arrangements discussed above with regard to other embodiments, weighing scale 800 operates by sensing a load on sections 802 and 804, and communicating the total weight of the load by way of output device 816 or 816'. In the exemplary embodiment shown, output devices 816 and 816' include a display 832 that is operative to visually output the weight of the associated object.

In a deployed or otherwise assembled condition (e.g., full-width position or extended-width position), sections 802 and 804, together with the connecting members that are being used, form stable, flat surfaces that can each at least partially support the associated object that is to be weighed. The full load of the associated object is transferred through the scale sections to surface-engaging members 812 that contact a floor FLR or other base surface and transmit the full load thereto. Thus, the total load of the associated object is distributed to the two scale sections in equal or non-equal proportions, which are represented by load portion arrows LP1 and LP2 in FIGS. 24 and 26. The load portion on each scale section is transferred to the floor by the surface engaging member or members of that scale section. In the present exemplary embodiment, two surface-engaging members 812 are included on each scale section, and in the exemplary embodiment shown, the surface-engaging members are disposed toward peripheral wall 818 of the scale sections in a direction opposite passages 820 rather than being centered on the support platform thereof. Regardless of where the surface-engaging members are positioned on the associated support platform, it is unlikely that during use the load portions will be precisely centered and balanced on the surface-engaging members. As such, load conditions such as those discussed hereinafter are likely to exist in some form (e.g., magnitude and/or direction).

Typically, the load portion carried by the associated scale section will be located more toward the center of the support platform. As such, an offset will often be formed between the load portion and the one or more surface-engaging members of that section, as indicated by dimensions OS1 and OS2 in FIGS. 24 and 26. An axis of rotation AX1 and AX2 will be formed for each of the scale sections about which the scale section will tend to rotate due, at least in part, to the offset of the load portion that is being carried by that scale section. The direction of rotation about axes AX1 and AX2 due to the load condition shown is indicated by arrows RT1 and RT2, respectively. As such, connecting members 822 and 824 preferably include a suitable combination of material properties and geometric configurations to oppose the moment load about axes AX1 and AX2 that is created by load portions LP1 and LP2 respectively acting at offsets OS1 and OS2. As such, exemplary materials can include plastics and metals, for example, and exemplary geometric configurations can include cylindrical shapes, for example. The counter-rotation forces attributable to the connecting members are indicated generally by arrows CR1 and CR2. One benefit of this arrangement is that the offset positioning of the surface-engaging members creates an area in which to provide the recesses that receive the surface-engaging members of the other scale section. This permits the scale to have a more compact storage configuration than might possible with other arrangements and/or configurations.

The load of the associated object can be measured by any suitable known electronic load sensors 834 disposed on or within the scale. For example, a load sensor can be installed on each surface-engaging member, between each surface-engaging member and the associated support platform, or between multiple component pieces of the surface-engaging members, such as parts 813A and 813B (FIGS. 24 and 26), for example. Each load sensor is operative to create an electronic signal that can be correlated to the portion of the full load that is supported by the surface-engaging member with which that sensor is associated. By summing the loads experienced by the sensor at each of the surface-engaging members, and scaling or otherwise converting that signal for output in appropriate units, the total weight sensed by the scale can be determined and displayed or otherwise communicated.

One exemplary embodiment of a suitable load sensing system is shown in use on scale 800 in FIGS. 23 and 25. The load sensing system includes display 832 and a suitable operating circuit or device 836 for selectively operating the visual and/or audible output devices and for summing the signals from load sensors 834. In one exemplary embodiment, load sensors 834A and 834B, which are associated with surface-engaging members 812A and 812B on scale section 802, are connected to circuit or device 836 via conductive leads 838A and 838B. Additionally, the load sensing system will typically include a power source, such as a battery 840, for example, that can provide electrical power to display 832 and/or circuit 836. Such a power source can optionally be used to supply electrical power to load sensors 834, such as through leads 838. It will be appreciated that the conductive leads described herein can include any suitable number of one or more conductors, and in many arrangements the leads will include four or more conductive elements.

In the embodiment shown in FIGS. 18-26, scale sections 802 and 804 of scale 800 are fully separable from one another. In one exemplary embodiment, a suitable wire or conductive lead (not shown) could be connected between the two scale sections to provide electrical power to the opposing scale section, which in some arrangements may not include a battery. Such a wire could also be utilized to communicate the signals from the load sensing devices of that scale section to the operating circuit of the output device.

In the exemplary embodiment shown in FIGS. 18-26, however, electrical power and/or signals can be communicated between the scale sections using the connecting members, such as connecting members 822 or 824, for example. In such an embodiment, the connecting members or at least portions thereof are preferably formed from a conductive material, such as metal, for example. Alternately, the connecting members can include one or more electrically conductive elements extending through or along the connecting elements. Additionally, passages 820 can include suitable electrical contacts and/or terminals 841 for forming an electrical connection with the connecting members or conductive portions thereof. Terminals 841 on scale section 802 can be placed in electrical communication with operating circuit or device 836 using leads 842A and 842B. Electrical power and/or signals can then be communicated between the connecting members and the load sensors in a suitable manner, such as by using leads 838C and 838D which can optionally be in contact with terminals 841 of scale section 804 to communicate with load sensors 834C and 834D, respectively. According to one example of suitable operation of such an arrangement, the load sensors can output a variable current level, such as 4-20 mA, for example, which will generally vary in a relation to the portion of the full load thereon. The output signal from each load sensor can then be summed or otherwise converted into a signal indicative of the full load of the object on the scale. It will be appreciated, however, that other suitable signal communication schemes or processing methods can alternately be used.

Optionally, the load sensing system could also include a second operating circuit or device 844 supported on scale section 804. Operating circuit 844 is shown in electrical communication with load sensing devices 834C and 834D on scale section 804 via conductive leads 838C and 838D, which can include any suitable number and/or type of conductive elements, as discussed above. The operating circuit is in electrical communication with circuit 836 through the connecting members and leads 842 via leads 846A and 846B, which extend between operating circuit 844 and terminals or contacts 841 provided along passages 820 on scale section 804. Operating circuit 844 can be operative to merely pass electrical signals therethrough, such as between load sensing devices 834C and 834D and operating circuit 836. Optionally, operating circuit 844 can provide signal and/or power conditioning of the electrical signals. In such an arrangement, electrical power is provided from battery 840, for example, and the electrical power and sensor signals are only passed-through operating circuit 844, which may function more as a terminal block or connector body than as a processing device.

Alternately, circuit 844 can optionally include a power supply, such as a battery 848, for example. In such arrangements, electrical power can be provided to load sensors 834C and 834D by battery 848 and only the individual output signals from the load sensing devices are communicated to operating circuit 836 through operating circuit 844. In such an arrangement, the total load remains determined at operating circuit 836 from the individual output signals from the load sensors. Furthermore, operating circuit 844 can optionally include summing circuitry or a suitable device for summing the output signals from the associated load sensors. The summed output signal could then be communicated to operating device 836 in a suitable manner to be combined with the output signals from the load sensor on scale section 802. In either case, however, the portion of the load supported on scale section 804 is communicated to output device 816 or 816' for determination of the full weight of the associated object and display or other communication of the same.

Another exemplary embodiment of a weighing scale 900 is shown in FIG. 27. It will be appreciated that scale 900 is similar to scale 800 discussed above with regard to FIGS. 18-26. Additionally, it will be appreciated that the features and elements shown in and discussed with regard to these two embodiments are interchangeable and/or can be used in the alternative.

Weighing scale 900 includes a first scale section 902 and a second scale section 904 separable from the first scale section. The scale sections include support platforms 906, each having a top surface 908 and an opposing bottom surface (not numbered). Feet or surface-engaging members 910 extend from support platforms 906 generally opposite top surfaces 908. Recesses 912 are provided along the bottom surfaces of the support platforms 906 and extend thereinto for receipt of the surface-engaging members of the opposing platform scale section.

Scale sections 902 and 904 include suitable connecting features, such as passages 914 that extend into support platforms 906 from along peripheral edges 916. One or more connecting members extend between scale sections 902 and 904 to form a substantially unitary structure. Connecting members 918 are shown in FIG. 27 as engaging passages 914 and extending between scale sections 902 and 904. Connecting members 918 include connecting segments 920 that are telescopically received in outer segments 922. Thus, connecting members 918 are extendable to provide a variety of lengths. Additionally, a second, shorter connecting member 924 is also provided. Optionally, storage channels 926 and 928 can be provided to respectively receive connecting members 918 and 924 when one or more of the same is not in use. Furthermore, an access opening 930 extends across channels 926 and 928 and is suitable for providing access to the connecting members to facilitate insertion and removal of the same to and from the channels.

Scale 900 also includes an output device 932 that includes a display 934 operable to visually output the full weight of an associated object. Output device 932 also includes an operating circuit or device 936 suitable for selectively operating display 934 and for summing or otherwise determining the full weight of the associated object based upon input signals from load sensing devices 938. Scale section 902 includes load sensing devices 938A and 938B respectively provided on surface-engaging members 910A and 910B. Scale section 904 includes load sensing devices 938C and 938D respectively associated with surface-engaging members 910C and 910D. Conductive leads 940A and 940B respectively extend between load sensing devices 938A and 938B and operating device 936. A battery 942 is also included on output device 932 and is operable to provide electrical power to display 934 and/or load sensing devices 938A and 938B.

Scale section 904 includes a second operating circuit or device 944, which is in electrical communication with load sensing devices 938C and 938D via conductive leads 940C and 940D, respectively. Operating circuit 944 also includes a suitable power supply, such as a battery 946, for example, that is adapted to provide electric power to the load sensing devices. As such, the connecting members, such as connecting members 918 and 924, for example, may not be utilized as conductive elements to supply electrical power from scale section 902 to scale section 904, as described in other embodiments. Accordingly, the connecting members could, optionally, be formed from a nonconductive material. It will be appreciated, however, that the portion of the load carried by scale section 904 will still need to be communicated to operating circuit 936 disposed on scale section 902. Where no electrically conducted path is provided between the two scale sections, an alternate communication arrangement can be used. For example, operating circuit 944 on scale section 904 receives output signals from load sensing devices 938C and 938D by way of conductive leads 940C and 940D. Operating circuit 944 includes a transmitter 948 operative to broadcast electromagnetic waves WVS to a corresponding receiver 950 disposed on scale section 902. Receiver 950 is in communication with operating circuit 936 via conductive lead 952. Using this arrangement, operating circuit 944 receives output signals from the load sensing devices on scale section 904 and outputs electromagnetic waves WVS to receiver 950, which receives the waves and communicates one or more signals corresponding thereto to operating circuit 936. Electromagnetic waves WVS can be broadcast in any suitable manner and using any suitable frequency or range of frequencies (e.g., IR or RF). Additionally, the waves can be generated suing any suitable communication method to correlate the broadcast message or signal.

Figure 28:
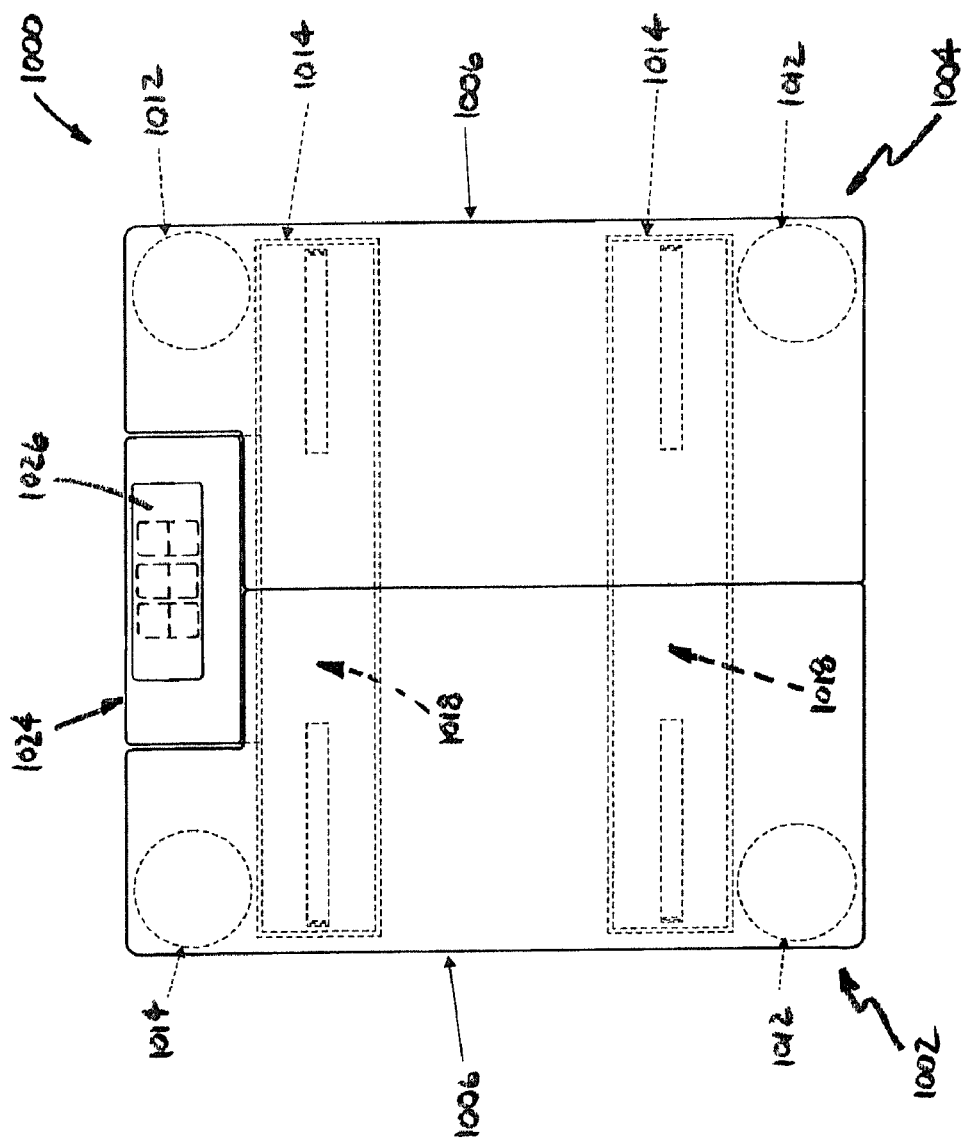
FIG. 28 is a top view of a seventh embodiment of a weighing scale in accordance with the present invention shown in a collapsed position.

Yet another exemplary embodiment of a weighing scale 1000 is shown in FIGS. 28-30 and includes a first scale section 1002 and a second scale section 1004 that is separable from the first scale section. The scale sections each include a support platform 1006 having a top surface 1008 and an opposing bottom surface 1010. Feet or surface-engaging members 1012 extend from bottom surface 1010 of each scale section. Passages 1014 extend into support platforms 1006 from along an inner peripheral edge 1016 of the support platforms. Connecting members 1018 are received within passages 1014 and extend between scale sections 1002 and 1004. A slot or other opening 1020 is provided through bottom surface 1010 of the support platforms and a tab or other projection 1022 extends from connection members 1018 and is operative to limit travel of the scale sections relative to the connecting members.

Weighing scale 1000 also includes an output device 1024. The output device includes a display 1026 operable to visually output the full weight of an associated object. Additionally, an audible output device, such as a speaker (not shown), can optionally be provided. Output device 1024 also includes an operating circuit 1028 that is in communication with load sensing devices 1030 through conductive leads 1032. A power source, such as a battery 1034, is also provided on output device 1024 and can be used to supply electrical power to display 1026, operating circuit 1028 and/or load sensing devices 1030.

Scale 1000 differs from weighing scales 800 and 900 discussed above in that scale sections 1002 and 1004 of scale 1000 are secured on connecting members 1018 and the same are not intended to be easily removable. As such, scale 1000 is useable in a normal or full-width condition, such as that shown in FIG. 28, for example. Additionally, weighing scale 1000 is usable in an extended-width condition, as shown in FIGS. 29 and 30. Furthermore, scale 1000 can also be used in any intermediate position as may be desired by the user.

While the invention has been described with reference to preferred embodiments and considerable emphasis has been placed herein on the structure and structural interrelationships between the component parts of the invention disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. Rather, it is intended that the invention be construed as including all such modifications and alterations insofar as they come within the scope of the appended claims and the equivalents thereof.

What is claimed is:

1. A collapsible weighing scale operative to output the full weight of an associated object, said collapsible weighing scale comprising:
   a base member including an axis and a top surface;
   a plurality of pivot arms pivotally connected to said base member;
   a plurality of support members each operatively connected to at least one of said plurality of pivot arms and including a longitudinal length, a first surface portion and a second surface portion disposed generally opposite said first surface portion, said plurality of support members displaceable relative to said base member between a collapsed position and an extended position;
   a plurality of feet adapted to engage an associated support surface, at least one of said plurality of feet being disposed along each of said plurality of support members and being located in a position outward from said connection with said at least one pivot arm, each of said plurality of feet projecting from said second surface portion of said plurality of support members such that said base member is supported in spaced relation to the associated support surface;
   a load sensing apparatus operative to supply an output signal having a relation to the full weight of the associated object; and,
   an output device for communicating the full weight of the associated object, said output device being in electrical communication with said load sensing apparatus and receiving said output signal therefrom;
   in said collapsed position, said longitudinal length of said plurality of support members being substantially aligned with said axis of said base member; and,
   in said extended position, said longitudinal length of said plurality of support members being oriented generally transverse to said axis of said base member with said first surface portion of said plurality of support segments and said top surface of said base member facing in a common direction.

2. A collapsible weighing scale according to claim 1 further comprising a platform at least partially supported on at least one of said base member and said plurality of support members.

3. A collapsible weighing scale according to claim 1, wherein said output device is supported on said base member.

4. A collapsible weighing scale according to claim 1, wherein said base member includes a bottom surface spaced from said top surface and a height defined between said top and bottom surfaces, said plurality of pivot arms being pivotally connected to said base member in spaced relation to said top surface in a heightwise direction from said top surface.

5. A collapsible weighing scale according to claim 1, wherein said base member includes a bottom surface spaced from said top surface, a height defined between said top and bottom surfaces, and a pair of opposed walls extending heightwise between said top and bottom surface, said opposed walls at least partially defining a pair of opposed openings in said base member.

6. A collapsible weighing scale for outputting the full weight of an associated object, said scale comprising:
- a support structure including an axis, a base member extending along said axis, and a plurality of pivot arms pivotally mounted on said base member, said base member including a pair of opposed sides, at least one pivot arm of said plurality of pivot arms extending outwardly from each of said pair of opposed sides of said base member;
- a plurality of support members operatively connected to said pivot arms, said plurality of support members being displaceable between extended and collapsed positions, in said collapsed position said support members extending in generally aligned relation to said axis and in said extended position said support members extending in generally transverse relation to said axis with at least a portion of at least one of said support members disposed outwardly beyond one of said opposing sides of said base member;
- a load sensing apparatus mounted to said support structure, said load sensing apparatus providing an output signal of the full weight of the associated object; and,
- an output device for communicating the full weight of the associated object, said output device being in electrical communication with said load sensing apparatus and receiving said output signal therefrom.

7. A collapsible weighing scale according to claim 6, wherein said support structure has a first width in said collapsed position of said plurality of support members and a second width that is greater than said first width in said extended position of said support members.

8. A collapsible weighing scale according to claim 7, wherein said base member has a base width, and said first width of said support structure in said collapsed position is approximately equal to said base width of said base member.

9. A collapsible weighing scale according to claim 6, wherein said plurality of pivot arms includes a first pivot arm located at a first position about said central body and a second pivot arm located at a second position about said central body directly opposite said first position of said first pivot arm.

10. A collapsible weighing scale according to claim 9, wherein said first pivot arm extends outwardly from said central body in a direction opposite said second pivot arm.

11. A collapsible weighing scale according to claim 6, wherein said central body has an approximately rectangular outer peripheral shape.

12. A collapsible weighing scale comprising:
- a central body having a top side, a bottom side, an outer periphery and a body height defined between said top side and said bottom side;
- a plurality of support members with each of said plurality of support members including at least one foot adapted to engage an associated support surface;
- a plurality of pivot arms connected to said central body with each of said plurality of pivot arms connected to said central body at a pivot point disposed in spaced relation in approximately said heightwise direction to said top side of said central body, said plurality of pivot arms being interconnected to said plurality of support members and being coupled for movement between a collapsed configuration and an extended configuration;
- a load sensing apparatus operatively connected to at least said plurality of support members to sense a full weight of an associated object while positioned in said extended configuration; and,
- a display connected to said load sensing apparatus and operative to convert the full weight sensed by said load sensing apparatus to human recognizable form;
- in said collapsed configuration, at least a portion of each of said plurality of pivot arms being disposed below said top side and within said outer periphery of said central body;
- in said extended configuration, said top side of said central body being disposed in an approximately common plane with said plurality of support members.

13. A collapsible weighing scale according to claim 12, wherein said central body includes a plurality of recesses extending thereinto and at least one of said pivot points are at least partially disposed within one of said plurality of recesses.

14. A collapsible weighing scale according to claim 12, wherein said plurality of pivot points are disposed along said bottom side of said central body.

15. A collapsible weighing scale according to claim 12, wherein a length of said plurality of pivot arms is less than a length of said plurality of support members interconnected therefrom.

16. A collapsible weighing scale according to claim 12, wherein said plurality of pivot points are located in an approximately common plane.

17. A collapsible weighing scale according to claim 12 wherein said display is supported on said central body.

18. A collapsible weighing scale according to claim 12, wherein said load sensing apparatus includes a summing circuit.

19. A collapsible weighing scale according to claim 12, wherein said plurality of pivot arms includes at least four pivot arms.

20. A collapsible weighing scale according to claim 19, wherein said plurality of support members includes at least four support members.

* * * * *